United States Patent
Shigetake et al.

(10) Patent No.: US 7,319,470 B2
(45) Date of Patent: Jan. 15, 2008

(54) CONTENT DELIVERY SYSTEM, CONTENT SERVER, AND CONTENT DELIVERY METHOD

(75) Inventors: Hideki Shigetake, Funabashi (JP); Keisuke Tsuji, Ichikawa (JP); Takahiro Komoriya, Kasukabe (JP)

(73) Assignee: Sharp Kabushiki Kaisha, Osaka (JP)

( * ) Notice: Subject to any disclaimer, the term of this patent is extended or adjusted under 35 U.S.C. 154(b) by 320 days.

(21) Appl. No.: 10/478,008

(22) PCT Filed: May 7, 2002

(86) PCT No.: PCT/JP02/04438

§ 371 (c)(1),
(2), (4) Date: Nov. 17, 2003

(87) PCT Pub. No.: WO02/095594

PCT Pub. Date: Nov. 28, 2002

(65) Prior Publication Data

US 2004/0169666 A1    Sep. 2, 2004

(30) Foreign Application Priority Data

May 18, 2001    (JP)    ............................. 2001-149516

(51) Int. Cl.
*G09G 5/00* (2006.01)

(52) U.S. Cl. ........................ 345/660; 715/758; 345/636

(58) Field of Classification Search .................... None
See application file for complete search history.

(56) References Cited

U.S. PATENT DOCUMENTS 4,990,904 A * 2/1991 Zenda ......................... 345/3.3
5,351,064 A * 9/1994 Zenda ......................... 345/3.3
5,819,301 A * 10/1998 Rowe et al. .................. 715/513

(Continued)

FOREIGN PATENT DOCUMENTS

EP    949571 A    10/1999

(Continued)

OTHER PUBLICATIONS

Author: Joe Habraken, Title: Sams Teach Yourself Microsoft Outlook 98 in 10 Minutes, Date: 1998, Publisher: Sams Publishing, Pertinent pp. 46.*

(Continued)

*Primary Examiner*—Xiao Wu
*Assistant Examiner*—David Chu
(74) *Attorney, Agent, or Firm*—Birch, Stewart, Kolasch & Birch, LLP

(57) ABSTRACT

To provide a contents distribution system, a contents server and a contents distribution method that do not need a layout operation at the time of distribution of contents and that enable a check of the content of image data that is hard to browse. When distribution of contents is requested from a contents display terminal to a contents server, a contents distribution server obtains the classification of the contents display terminal, and obtains text data and image letter data corresponding to a font size of terminal information via the contents management server. The contents distribution server couples the obtained image letter data and text data to generate a contents page, and distributes the contents page to the contents display terminal.

21 Claims, 22 Drawing Sheets

U.S. PATENT DOCUMENTS

| | | | |
|---|---|---|---|
| 6,332,139 B1 * | 12/2001 | Kaneko et al. | 707/6 |
| 6,509,913 B2 * | 1/2003 | Martin, Jr. et al. | 715/762 |
| 6,668,169 B2 * | 12/2003 | Burgan et al. | 455/435.1 |
| 7,039,677 B2 * | 5/2006 | Fitzpatrick et al. | 709/204 |
| 7,120,455 B1 * | 10/2006 | Chen et al. | 455/466 |
| 2002/0112019 A1 * | 8/2002 | Watanabe | 709/213 |
| 2002/0126135 A1 * | 9/2002 | Ball et al. | 345/600 |
| 2003/0011643 A1 * | 1/2003 | Nishihata | 345/810 |
| 2003/0041102 A1 * | 2/2003 | Simpson et al. | 709/203 |
| 2004/0162877 A1 * | 8/2004 | Van Dok et al. | 709/204 |
| 2005/0055411 A1 * | 3/2005 | Bouchard et al. | 709/206 |
| 2006/0020969 A1 * | 1/2006 | Utsuki et al. | 725/39 |

FOREIGN PATENT DOCUMENTS

| | | |
|---|---|---|
| EP | 1 045 313 A2 | 10/2000 |
| JP | 6-309375 A | 11/1994 |
| JP | 9-081583 A | 3/1997 |
| JP | 9-319765 A | 12/1997 |
| JP | 11-328169 A | 11/1999 |
| WO | WO 98/15091 A | 4/1998 |
| WO | WO-98/35468 A2 | 8/1998 |
| WO | WO 02/29590 A | 4/2002 |

OTHER PUBLICATIONS

Author: Linda Jones, Title: Sams Teach Yourself Microsoft Word 97 in 24 Hours, Date: 1997, Publisher: Sams Publishing Pertinent pp. 391-392.*

* cited by examiner

CONTENT DELIVERY SYSTEM, CONTENT SERVER, AND CONTENT DELIVERY METHOD

CROSS REFERENCE TO RELATED APPLICATION

This application is the national phase under 35 U.S.C. § 371 of PCT International Application No. PCT/JP02/04438 which has an International filing date of May 7, 2002, which designated the United States of America.

BACKGROUND OF THE INVENTION

1. Field of the Invention

The present invention relates to a distribution system, a contents server and a contents distribution method for distributing contents composed of text data and image data via a network.

2. Related Art

In a homepage that displays text data and image data via the Internet, in a case where the size of image data to be displayed is large or in a case where there are a plurality of image data, data to be distributed is downsized by a method of, for example, distributing a page of only text data and making link from there to a page of only original image data, or inserting reduced image data of original image data into a page of text data and making link to a page of only original image prepared separately, whereby a load on the network is reduced.

An image recording and reproducing apparatus disclosed in Japanese Unexamined Patent Publication JP-A 6-309375 (1994) stores by associating an entire reduced image obtained by reducing the whole image data with partial image of a predetermined portion (for example, a central portion) in the same size as the entire reduced image. Consequently, a speedy image search is enabled.

A document filing apparatus disclosed in Japanese Unexamined Patent Publication JP-A 9-81583 (1997) stores by associating an entire document image with a partial image captured from the entire image, and presents to a user as a partial image index at the time of searching. Consequently, registration of a document is facilitated, and a load on a user is reduced.

A document image management apparatus disclosed in Japanese Unexamined Patent Publication JP-A 9-319765 (1997) extracts an important portion image from image data of a document image as a key region, and displays the key region and bibliographical information together. Consequently, it is possible to grasp the most content of the document image without displaying the whole image, and it is possible to decrease the cost of display.

However, in the case of making link from a page of only text data to a page of only original image data of contents, there is a problem that it is difficult to understand the content of original image only by browsing the page of only text data even if there is an explanation of the original image data in the content of the text data.

Further, although in the case of preparing a page that a reduced image of original image data is inserted into a text page and making link from there to a page of only original image data of contents, it is easier to understand than in the case of browsing a page of only text data, there is a need to manually lay out text data in accordance with the height and width of a reduced image of each image data.

Further, other than the above problems, in a case where original image data is image data that is too large to display on a display of a contents display terminal or image data of an undisplayable image format, there is a problem that it is difficult to browse the original image data and check the content.

FIG. 7 is a conventional display example of contents in which image data and text data coexist. Reduced image data 50 of original image data has a height of three lines and a width of three letters, and the image data and the text data should be laid out based on that information.

Because a size of original image data 52 obtained by linking from a page of a display example 51 is larger than a size of a display 53 of a contents display terminal, it is impossible to check the whole at one time. Moreover, in a case where it is impossible to display and check because of a certain problem, for example, in a case where a contents display terminal is not compatible with the format of original image, there is no choice but download the original image data 52 as it is without checking.

SUMMARY OF THE INVENTION

An object of the invention is to provide a contents distribution system, a contents server and a contents distribution method that do not need a layout operation at the time of distribution of contents and that enable a check of the content of image data which is difficult to browse.

The invention provides a contents distribution system comprising:

a contents display terminal for displaying contents composed of text data and image data on a display; and a contents server for distributing the contents to the contents display terminal via a network in response to a distribution request from the contents display terminal; the contents server including:

contents storing means for storing the contents; and image converting means having an image converting function of converting the image data to image letter data of a same size as a font size of the text data displayed by the display of the contents display terminal, wherein, in response to a contents distribution request from the contents display terminal, the contents server couples the text data and the image letter data and distributes the coupled data to the contents display terminal.

According to the invention, the contents server causes the image converting means to convert the image data of contents to the image letter data of the same size as the font size of text data displayed by the display of the contents display terminal. When distribution of contents is requested from the contents display terminal to the contents server, the contents server couples the text data and the image letter data and distributes the coupled data to the contents display terminal, with the result that it is allowed to deal with image data as one letter of text data, it is unnecessary to do a manual layout operation even when image data and text data coexist, and it is possible to distribute contents that the outline of image data is easier to understand than a page of only text data of contents.

Further, the invention is characterized in that:

the image converting means converts the image data of the contents to preview image data of almost a same size as a display size of the contents display terminal; and the contents server distributes the preview image data to the contents display terminal in response to a preview image data distribution request from the contents display terminal.

According to the invention, the contents server causes the image converting means to convert the image data of contents to preview image data of almost the same size as the display size of the contents display terminal. When distribution of the preview image data is requested from the contents display terminal to the contents server, the contents server distributes the preview image data to the contents display terminal, with the result that the whole image data is displayed in a suitable size for the display, and it becomes easier to check the whole image data.

Further, the invention is characterized in that:

the contents server distributes the image data to the contents display terminal in response to an image data distribution request from the content display terminal; and the contents display terminal has image data storing means for storing distributed image data, and displays the distributed image data when it can be displayed on the display.

According to the invention, the contents display terminal stores distributed image data in the image data storing means. Image data is displayed when it can be displayed on the display, and it is also possible, in a case where it cannot be displayed for such a reason that an image format is not suited, to output image data stored in the image data storing means from an appropriate output apparatus as necessary.

The invention is characterized in that the contents server comprises terminal information storing means for storing the font size of the text data displayed by the display of the contents display terminal and the display size as terminal information.

According to the invention, the contents server comprises the terminal information storing means, and the font size of the text data displayed by the display of the contents display terminal and the display size are stored as terminal information in the terminal information storing means, with the result that, based on the terminal information, the image converting means can generate, from image data, image letter data converted to almost the same size as the font size and preview image data converted to almost the same size as the display size. Therefore, even in the case of distributing contents to a plurality of contents display terminals having different font sizes and display sizes, it is possible, by storing terminal information of the respective contents display terminals in the terminal information storing means, to distribute image letter data and preview image data of appropriate sizes to the respective contents display terminals.

Further, the invention provides a contents server for distributing contents composed of text data and image data to a contents display terminal via a network in response to a distribution request from the contents display terminal, the contents server comprising:

contents storing means for storing the contents; and image converting means having an image converting function of converting the image data to image letter data of almost a same size as a font size of text data displayed by the display of the contents display terminal, wherein, in response to a contents distribution request from the contents display terminal, the contents server couples the text data and the image letter data and distributes the coupled data to the contents display terminal.

According to the invention, the contents server causes the image converting means to convert the image data to image letter data of almost the same size as the font size of text data displayed by the display of the contents display terminal. When distribution of contents is requested from the contents display terminal to the contents server, the contents server couples text data and image letter data and distributes the coupled data to the contents display terminal, with the result that it is allowed to deal with image data as one letter of text data, it is unnecessary to do a manual layout operation even when image data and text data coexist, and it is possible to distribute contents that the outline of image data is easier to understand than a page of only text data of contents.

The invention is characterized in that:

the image converting means converts the image data of the contents to preview image data of almost the same size as a display size of the contents display terminal; and in response to a preview image data distribution request from the contents display terminal, the preview image data is distributed to the contents display terminal.

According to the invention, the contents server causes the image converting means to convert the image data of contents to the preview image data of almost the same size as the display size of the contents display terminal. When distribution of the preview image data is requested from the contents display terminal to the contents server, the contents server distributes the preview image data to the contents display terminal, with the result that the whole image data is displayed in a suitable size for the display, and it becomes easier to check the whole image data.

The invention is characterized by comprising terminal information storing means for storing the font size of the text data displayed by the display of the contents display terminal and the display size as terminal information.

According to the invention, the contents server comprises the terminal information storing means, and the font size of the text data displayed by the display of the contents display terminal and the display size are stored as terminal information in the terminal information storing means, with the result that, based on the terminal information, the image converting means can generate, from image data, image letter data converted to almost the same size as the font size and preview image data converted to almost the same size as the display size. Therefore, even in the case of distributing contents to a plurality of contents display terminals having different font sizes and display sizes, it is possible, by storing terminal information of the respective contents display terminals in the terminal information storing means, to distribute image letter data and preview image data of appropriate sizes to the respective contents display terminals.

Further, the invention provides a contents distribution method that a contents server comprising image converting means and contents storing means distributes contents composed of text data and image data via a network in response to a distribution request from a contents display terminal, the contents distribution method comprising the steps of:

storing uploaded contents in the contents storing means of the contents server;

converting image data to image letter data of almost a same size as a font size of text data displayed by a display of the contents display terminal, by the image converting means of the contents server; and coupling the text data and the image letter data and distributing the coupled data to the contents display terminal, in response to a contents distribution request from the contents display terminal, by the contents server.

According to the invention, contents are distributed by the step of storing uploaded contents in the contents storing means of the contents server, the step of converting image data to image letter data of almost the same size as the font size of the text data displayed by the display of the contents display terminal, by the image converting means of the contents server, and the step of coupling the text data and the image letter data and distributing the coupled data to the contents display terminal, in response to a contents distribution request from the contents display terminal, by the contents server, with the result that it is allowed to deal with image data as one letter of text data, it is unnecessary to do a manual layout operation even in a case where image data and text data coexist, and it is possible to distribute contents that the content of image data is easier to understand than a page of only text data of contents.

The invention is characterized in that:

the image converting means converts the image data of the contents to preview image data of almost a same size as the display size of the contents display terminal; and the contents server distributes the preview image data to the contents display terminal in response to a preview image data distribution request from the contents display terminal.

According to the invention, the contents server causes the image converting means to convert the image data of contents to the preview image data of almost the same size as the display size of the contents display terminal. When distribution of the preview image data is requested from the contents display terminal to the contents server, the contents server distributes the preview image data to the contents display terminal, with the result that the whole image data is displayed in a suitable size for the display, and it becomes easier to check the whole image data.

The invention is characterized in that the image converting means converts image data based on the font size of the text data displayed by the display of the contents display terminal and the display size.

The invention is characterized in that the contents server stores the font size of the text data displayed by the display of the contents display terminal and the display size as terminal information.

According to the invention, the contents server stores the font size of the text data displayed by the display of the contents display terminal and the display size as terminal information, with the result that, based on the terminal information, the image converting means can generate, from image data, image letter data converted to almost the same size as the font size and preview image data converted to almost the same size as the display size. Therefore, even in the case of distributing contents to a plurality of contents display terminals having different font sizes and display sizes, by storing terminal information of the respective contents display terminals in the terminal information storing means, it is possible to distribute image letter data and preview image data of appropriate sizes to the respective contents display terminals.

In the invention, it is preferable that the image data is still image data.

In the invention, it is preferable that the image data is moving image data.

BRIEF DESCRIPTION OF DRAWINGS

Other and further objects, features, and advantages of the invention will be more explicit from the following detailed description taken with reference to the drawings wherein.

DESCRIPTION OF THE INVENTION

Figure 1:
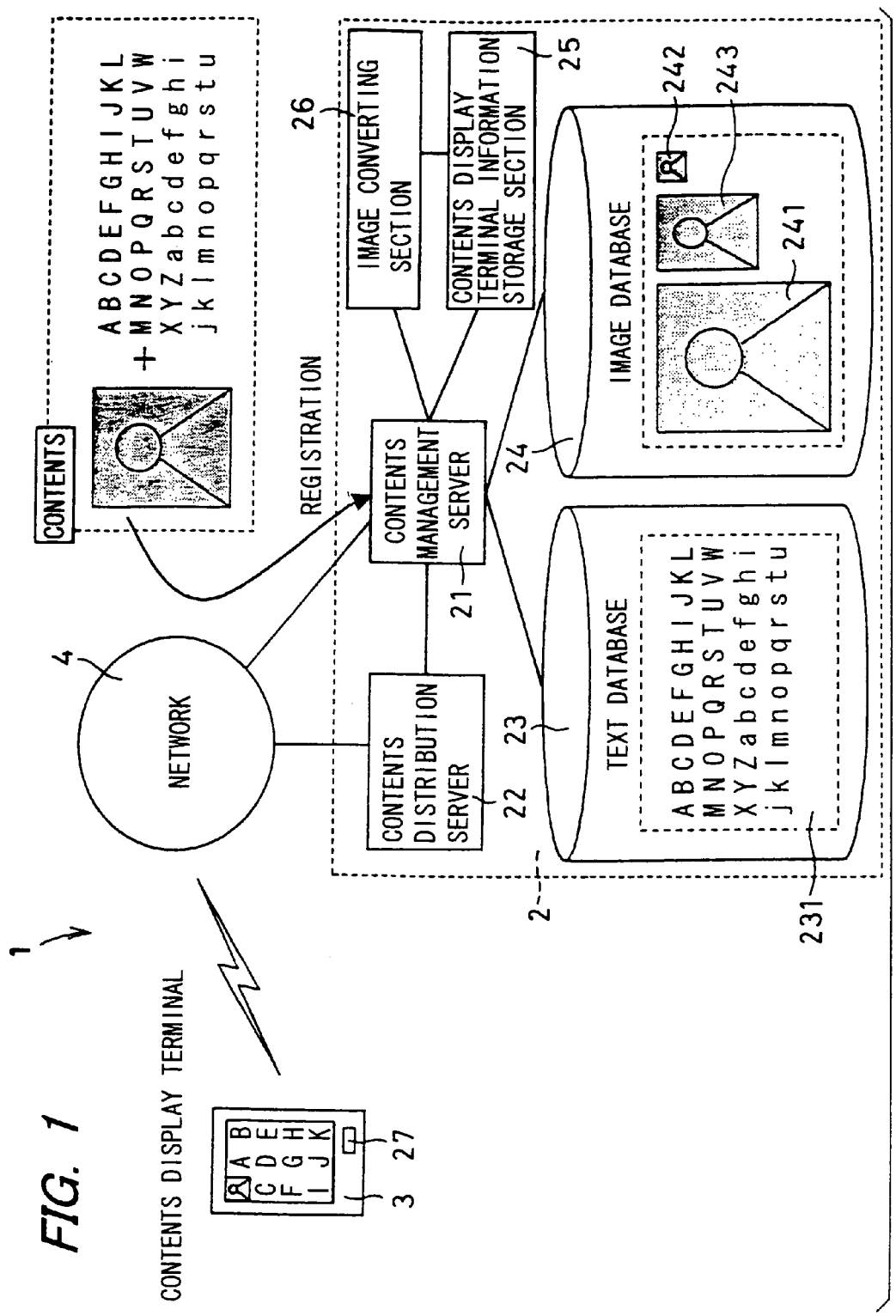
FIG. 1 is a block diagram showing the constitution of a contents distribution system, which is a first embodiment of the invention.

Now referring to the drawings, preferred embodiments of the invention are described below.

First Embodiment of the Invention

Below, a first embodiment of the invention will be described in detail referring to the drawings.

FIG. 1 is a block diagram showing the constitution of a contents distribution system 1, which is the first embodiment of the invention.

The contents distribution system 1 comprises a contents server 2 and a contents display terminal 3. The contents server 2 and the contents display terminal 3 are connected via a network 4.

The contents server 2 comprises a contents distribution server 22, a contents management server 21, a text database 23, an image database 24, a contents terminal information storage section 25, and an image converting section 26.

The contents display terminal 3 is realized by a personal computer (PC), a mobile terminal, a mobile phone or the like, and constituted so as to access the contents server 2 via the network 4 and be provided with distribution service of contents composed of text data and image data. Recently, it has become possible to connect to a network such as the Internet by a household telephone, a facsimile or the like. Therefore, the contents display terminal can be of any kind as far as it allows connection to the network.

The contents distribution server 22, in response to a distribution request from the contents display terminal 3, obtains contents designated by the contents management server 21 and distributes the contents to the contents display terminal 3.

The contents management server 21 manages registered contents, and when the contents distribution server 22 request contents, provides the designated contents to the contents distribution server 22.

The text database 23 and the image database 24 are contents storing means, and store text data 231 and image data 241 such as still image data of registered contents, respectively.

The contents display terminal information storage section 25 is terminal information storing means that stores the font size of text data displayed by a display of the contents display terminal 3 used in the contents distribution system 1 and the size of the display as terminal information.

The image converting section 26 is image converting means that has an image converting function. When image data of contents is registered in the contents management server 21 and stored in the image database 24, the image converting section 26, by the image converting function, obtains the font size and the display size stored in the contents display terminal information storage section 25 and generates image letter data 242 made by converting the original image data 241 to almost the same size, preferably, the same size as the font size. Besides, the image converting section 26, by the image converting function, generates preview image data 243 made by converting the original image data 241 to almost the same size, preferably, the same size as the display size of the contents display terminal 3.

The contents management server 21 stores the image letter data 242 and the preview image data 243 generated by the image converting section 26 together with the original image data 241 into the image database 24. In a case where the contents display terminal information storage section 25 stores a plurality of terminal information, the image converting section 26 generates image letter data and preview image data regarding the respective terminal information, and the contents management server 21 stores the generated plural image letter data and preview image data into the image database 24.

On request of contents distribution from the contents display terminal 3 to the contents server 2, the contents server 2 couples the text data 231 and the image letter data 242, and distributes the coupled data to the contents display terminal 3.

Figure 2:
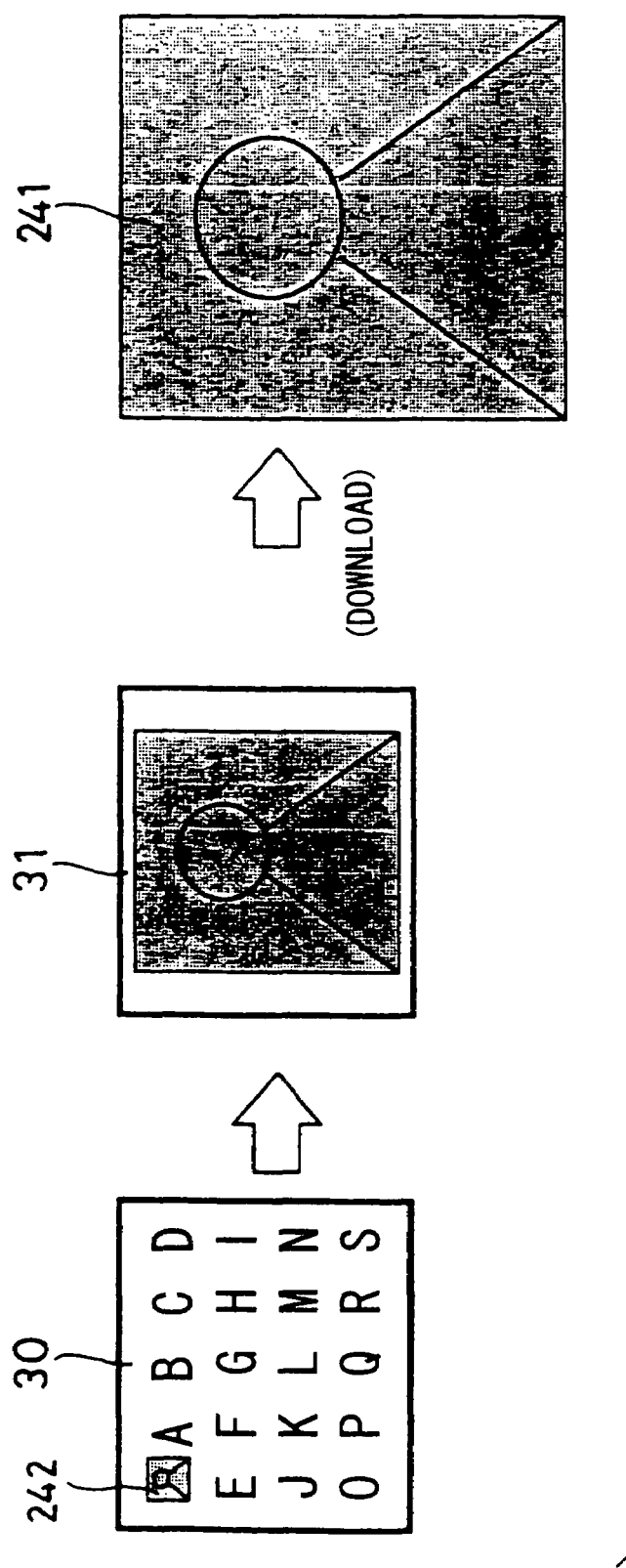
FIG. 2 is a view showing a contents display example of the embodiment of the invention.

On this occasion, as shown in a contents display example of the embodiment of the invention of FIG. 2, the image letter data 242 of a contents page 30 displayed on the display is almost the same size, preferably, the same size as the font size of the contents display terminal 3. Therefore, the image letter data 242 is dealt with as one letter of the text data 231, and the need for adjusting the linefeed position of the text data 231 or the like and laying out image data and text data is eliminated. This is particularly effective, for example, in a case where the display of the contents display terminal 3 is small, or in a case where image data is large as compared with the size of the display.

Further, when distribution of the preview image data 243 is requested from the contents display terminal 3 to the contents server 2, the contents server 2 distributes the preview image data 243 to the contents display terminal 3. At this moment, in a contents page 31 displayed on the display, only the preview image data 243 is displayed. The preview image data 243 is generated in an image format that can be displayed in the contents display terminal 3, the whole image data is displayed in an appropriate size for the display, and it becomes easier to check the whole image data. It is also possible, after checking the whole image, to download the original image data 241. When distribution of the original image data 241 is requested from the contents display terminal 3 to the contents server 2, the contents server 2 distributes the original image data 241 to the contents display terminal 3, and the image data 241 can be displayed when it can be displayed on the display of the contents display terminal 3. In such a case that an image format is not compatible, it is possible also to store into image data storing means 27 of the contents display terminal 3 and output from an appropriate output apparatus as necessary.

Therefore, by the contents distribution system 1 of the first embodiment of the invention, it is possible to distribute contents composed of text data and image data as a contents page composed of text data and image letter data that does not need a manual layout operation, firstly. Moreover, in the case of checking the content of image data, it is possible to distribute preview image data. Consequently, a user can download original image data after checking the content of image data, that is, it becomes possible to browse and obtain contents in an effective way.

Image letter data of the embodiment of the invention also has a feature of a pictograph that has a larger amount of information than text data made of only letters. Although a pictograph is hard to be generated automatically and is generated manually in usual, image letter data according to the invention can be automatically generated and has a larger amount of information than a pictograph.

Figure 3:
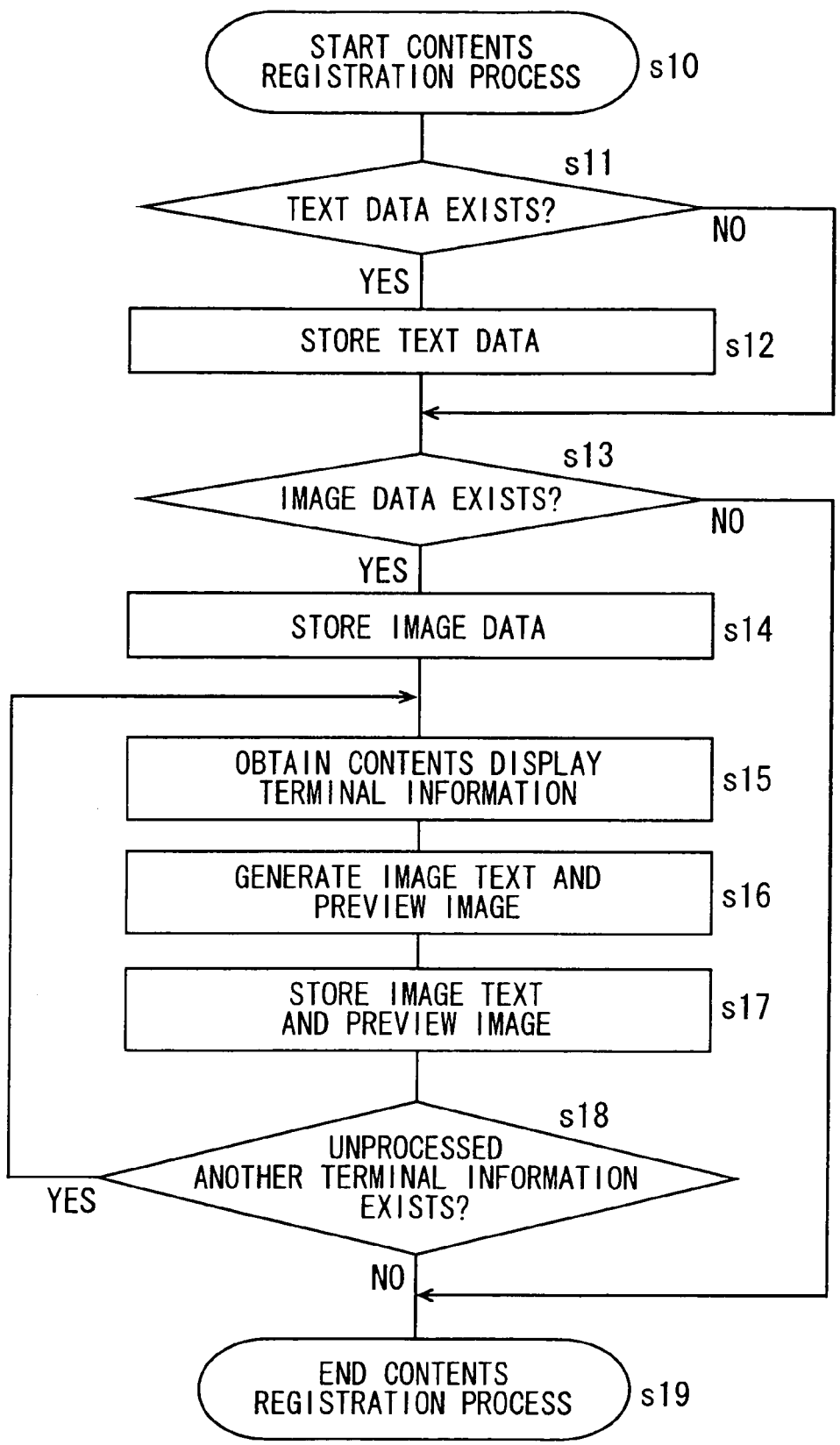
FIG. 3 is a flowchart showing a contents registration process of a contents management server in the contents distribution system of the first embodiment of the invention.

FIG. 3 is a flowchart showing a contents registration process of the contents management server 21 in the contents distribution system 1 of the first embodiment of the invention. When a registration event arises, for example, when contents are uploaded, the contents registration process is started at step s10. At step s11, the contents management server 21 determines whether contents to be registered include text data. In the case of determination that the contents do not include text data, the process goes to step s13. In the case of determination that the contents include text data, the process goes to step s12, the contents management server 21 stores the text data 231 into the text database 23, and the process goes to step s13. At step s13, the contents management server 21 determines whether the contents to be registered include image data. In the case of determination that the contents include image data, the process goes to step s14. In the case of determination that the contents do not include image data, the process goes to step s19, and the contents registration process is ended.

At step s14, the contents management server 21 stores the original image data 241 into the image database 24. At step s15, the contents management server 21 obtains the display size and the font size as terminal information from the contents display terminal information storage section 25. At step s16, based on the obtained terminal information, the contents management server 21 causes the image converting section 26 to generate, from the image data 241, the image letter data 242 converted to the font size and the preview image data 243 converted to the display size. At step s17, the contents management server 21 stores the image letter data and the preview image data generated at step s16 into the image database 24. After that, at step s18, the contents management server 21 determines whether terminal information on another contents display terminal is registered in the contents display terminal information storage section 25. In the case of determination that terminal information on another contents display terminal is registered, the process goes back to step s15 to be repeated. In the case of determination that terminal information on another contents display terminal is not registered, the process goes to step s19, and the contents registration process is ended.

Figure 4:
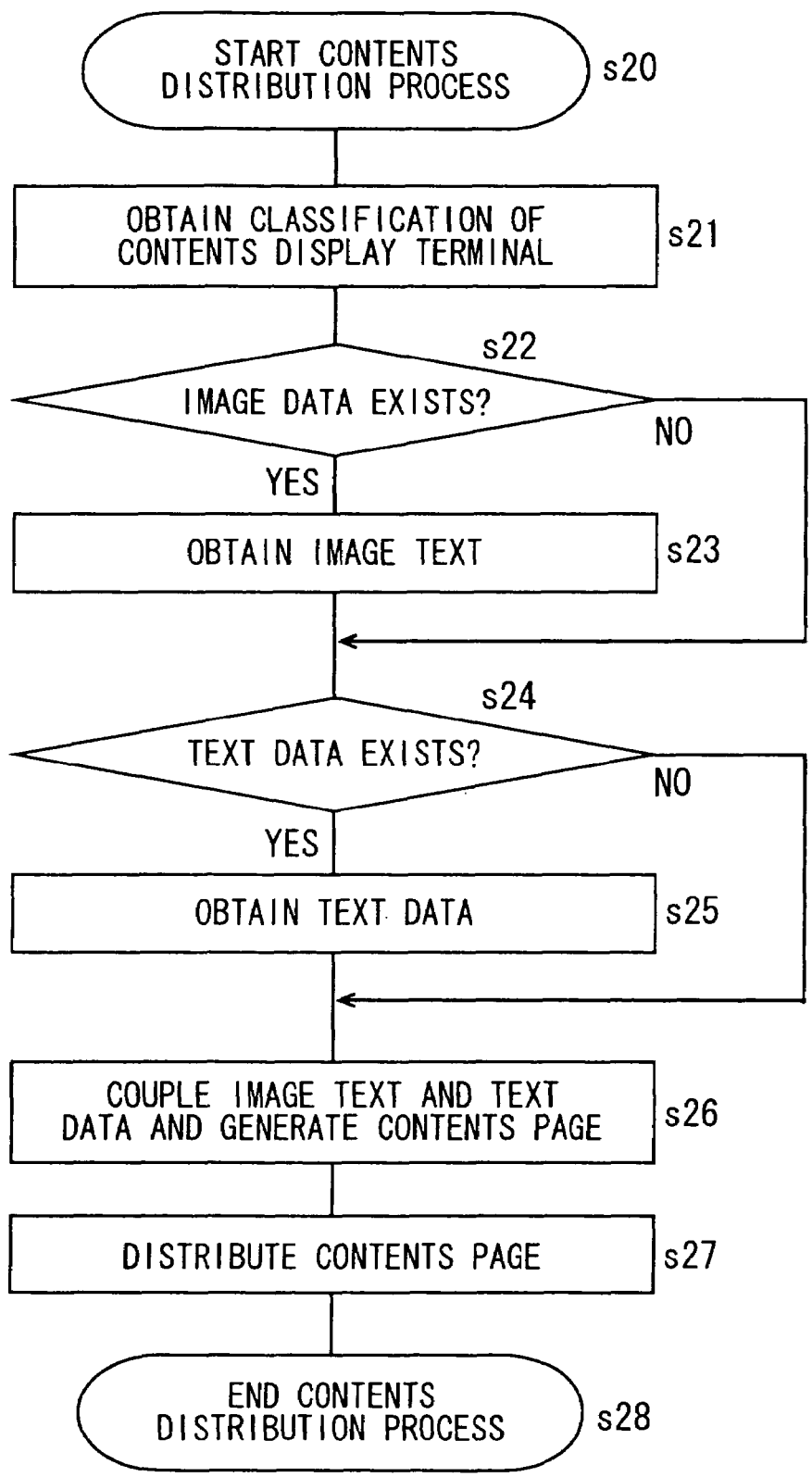
FIG. 4 is a flowchart showing a contents distribution process of a contents server in the contents distribution system of the first embodiment of the invention.

FIG. 4 is a flowchart showing a contents distribution process of the contents server 2 in the contents distribution system 1 of the first embodiment of the invention. When an event of a contents distribution request from the contents display terminal 3 to the contents server 2 arises, the contents distribution process is started at step s20. At step s21, the contents distribution server 22 obtains the classification of the contents display terminal 3 from a user agent property or the like included in a contents distribution request signal. At step s22, the contents distribution server 22 inquires of the contents management server 21 whether contents requested by the contents display terminal 3 to be distributed include image data. In a case where the contents include image data, at step s23, the contents management server 21 obtains terminal information corresponding to the classification of the contents display terminal 3 from the contents display terminal information storage section 25. The contents distribution server 22, via the contents management server 21, obtains the image letter data 242 corresponding to the font size of the terminal information, specifically, of almost the same size, preferably, the same size as the font size from the image database 24. In a case where the contents do not include image data, the process goes to step s24.

At step s24, the contents distribution server 22 inquires of the contents management server 21 whether the contents requested by the contents display terminal 3 to be distributed include text data. In a case where the contents include text data, at step s25, the contents distribution server 22 obtains the text data 231 of the contents from the text database 23 via the contents management server 21. In a case where the contents do not include text data, the process goes to step s26.

At step s26, the contents distribution server 22 couples the obtained image letter data 242 and text data 231, and generates a contents page. Although various coupling methods, for example, coupling the text data 231 to the image letter data 242, or coupling the image letter data 242 to the text data 231 can be thought as a coupling method on this occasion, this is set as a contents page generation rule in advance. It is needless to say that in a case where one of the image letter data 242 and the text data 231 does not exist, the contents distribution server 22 generates a page of only the existing data. In a case where either of the data does not exist, the contents distribution server 22 generates an exception page for a case where contents do not exist. At step s27, the contents distribution server 22 distributes the contents page generated at step s26 to the contents display terminal 3. After that, the process goes to step s28, and the contents distribution process is ended.

Figure 5:
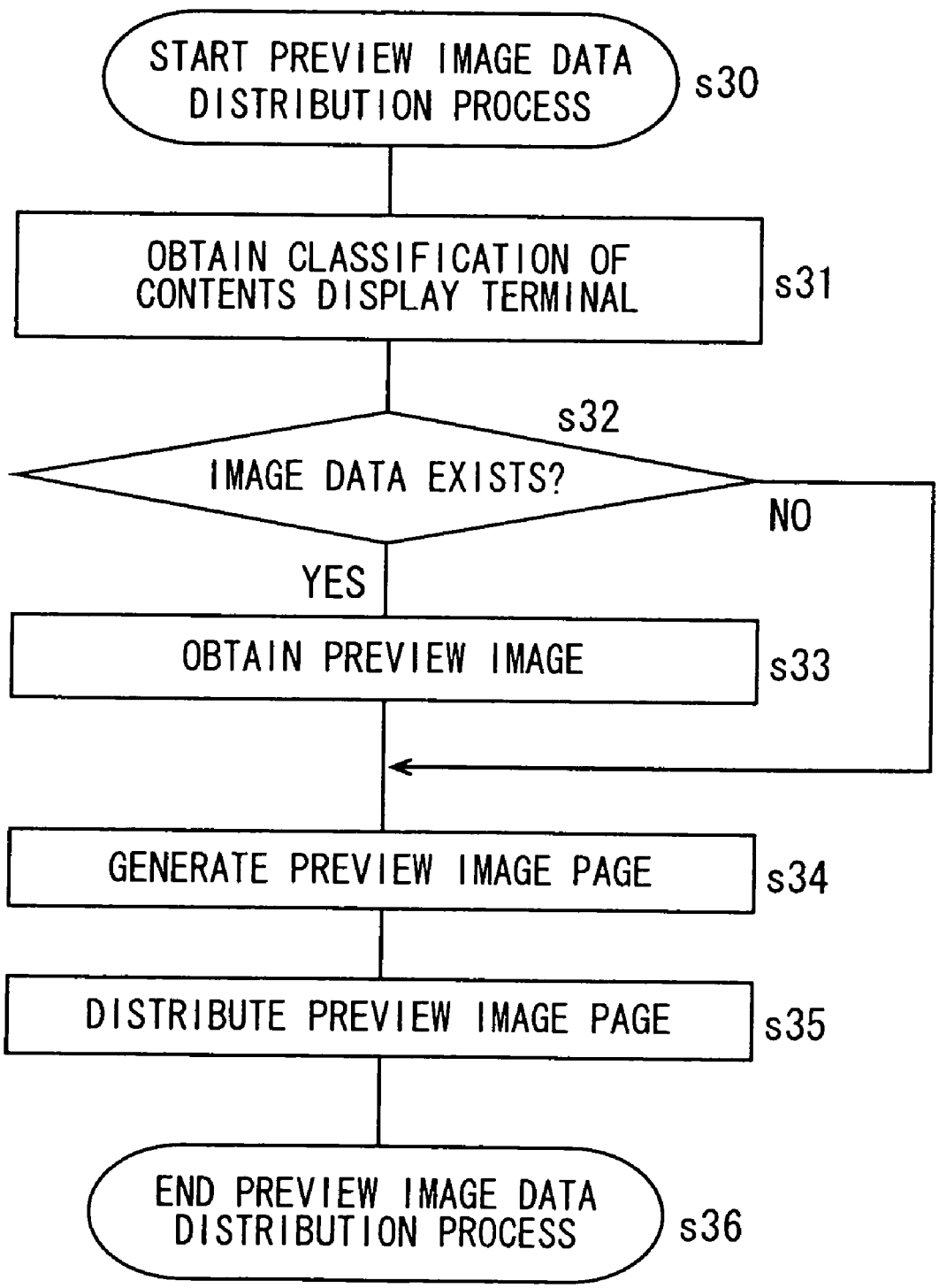
FIG. 5 is a flowchart showing a preview image data distribution process of the contents server in the contents distribution system of the first embodiment of the invention.

FIG. 5 is a flowchart showing a preview image data distribution process of the contents server 2 in the contents distribution system 1 of the first embodiment of the invention. When an event of a preview image data distribution request from the contents display terminal 3 to the contents server 2 arises, at step s30, the preview image data distribution process is started. At step s31, the contents distribution server 22 obtains the classification of the contents display terminal 3 from a user agent property or the like included in a contents distribution request signal.

At step s32, the contents distribution server 22 inquires of the contents management server 21 whether contents requested by the contents display terminal 3 to be distributed include image data. In a case where the contents include image data, at step s33, the contents management server 21 obtains terminal information corresponding to the classification of the contents display terminal 3 from the contents display terminal information storage section 25. The contents distribution server 22, via the contents management server 21, obtains the preview image data 243 corresponding to the display size of the terminal information, specifically, of almost the same size, preferably, the same size as the display size from the image database 24. In a case where the contents do not include image data, the process goes to step s34.

At step s34, the contents distribution server 22 generates a preview image page by using the obtained preview image data 243. In a case where image data does not exist in the contents, the contents distribution server 22 generates an exception page. At step s35, the contents distribution server 22 distributes the preview image page generated at step s34 to the contents display terminal 3. After that, the process goes to step s36, and the preview image data distribution process is ended.

Figure 6:
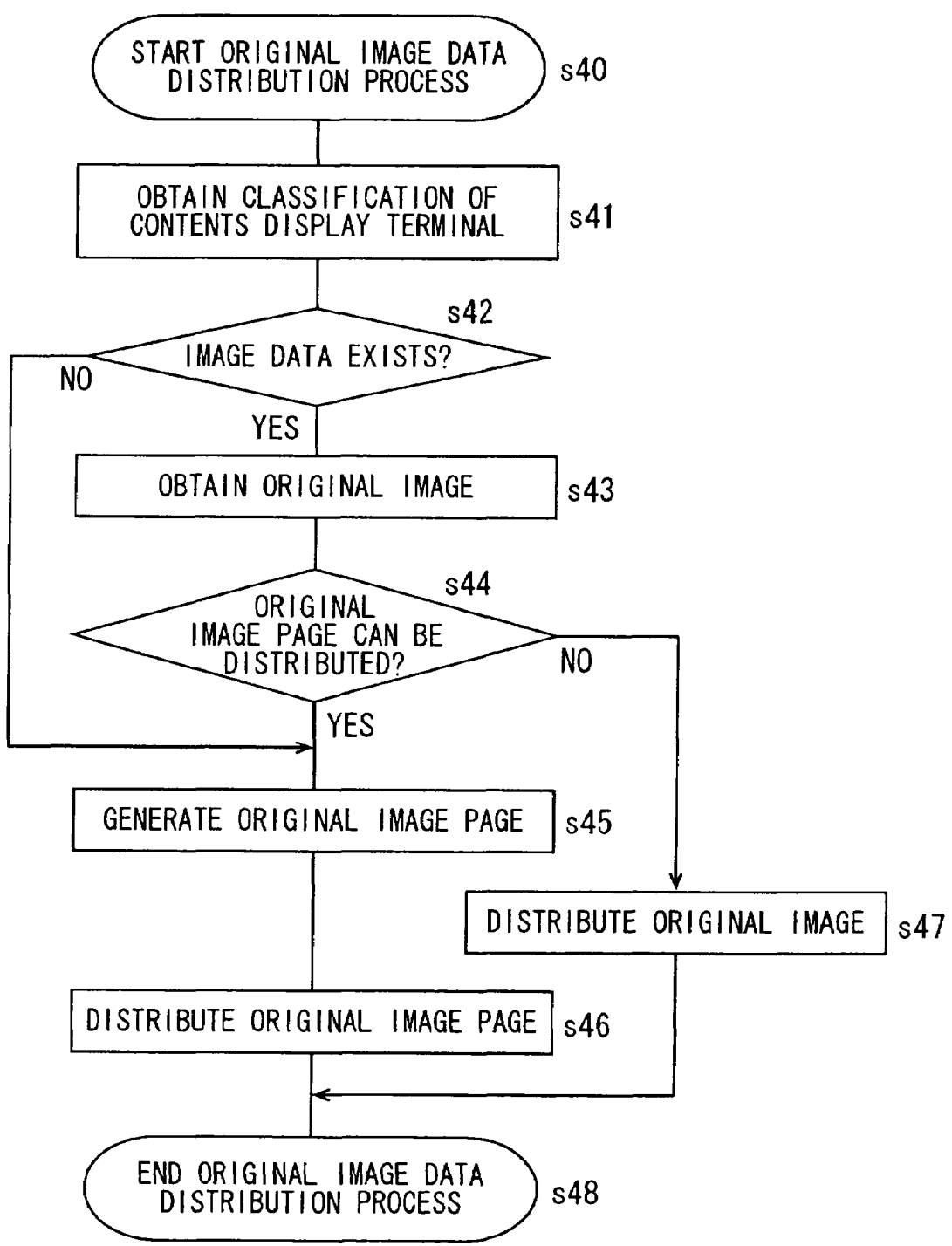
FIG. 6 is a flowchart showing an original image data distribution process of the contents server in the contents distribution system of the first embodiment of the invention.
Figure 7:
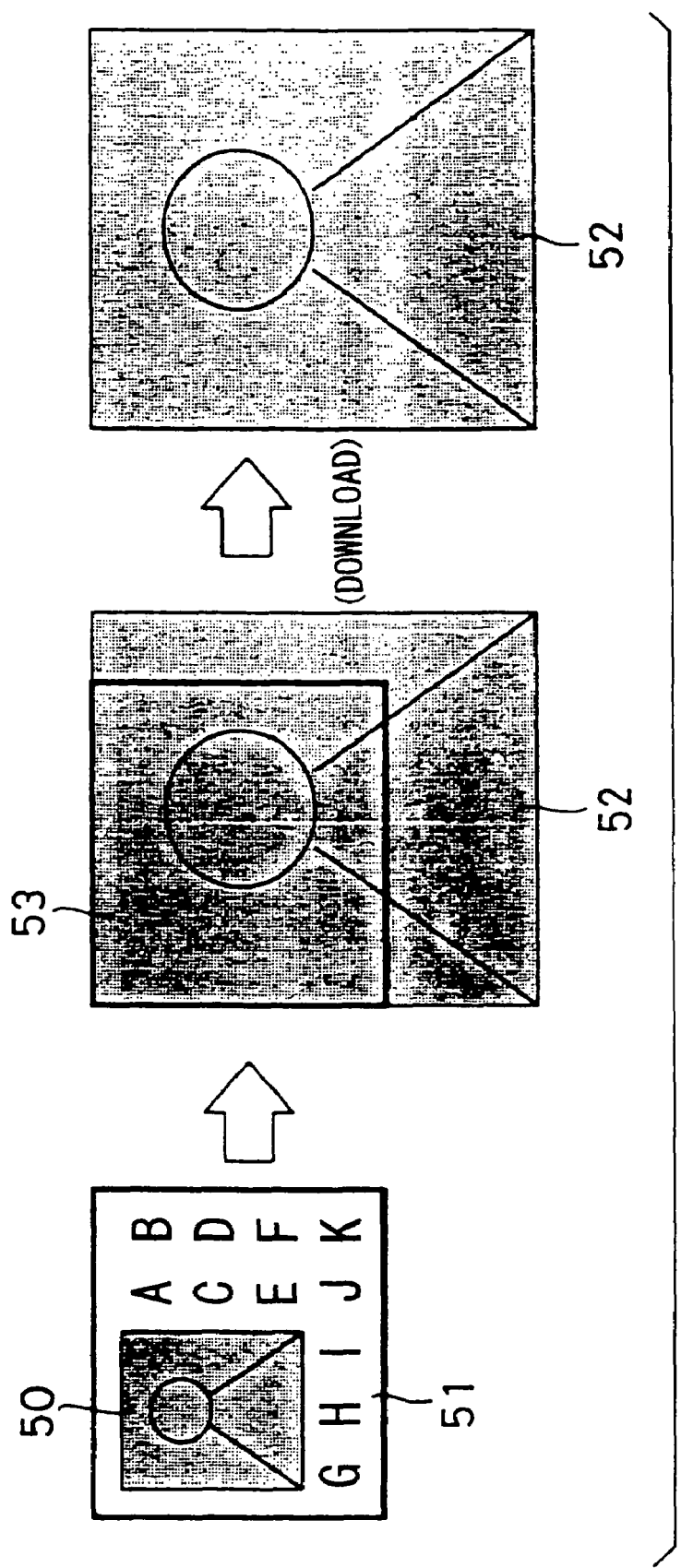
FIG. 7 is a conventional display example of contents in which image data and text data coexist.

FIG. 6 is a flowchart showing an original image data distribution process of the contents server 2 in the contents distribution system 1 of the first embodiment of the invention. When an event of an original image data distribution request from the contents display terminal 3 to the contents server 2 arises, at step s40, the original image data distribution process is started. At step s41, the contents distribution server 21 obtains the classification of the contents display terminal 3 from a user agent property or the like included in a contents distribution request signal.

At step s42, the contents distribution server 22 inquires of the contents management server 21 whether contents requested by the contents display terminal 3 to be distributed include image data. In a case where the contents include image data, at step s43, the contents distribution server 22 obtains the original image data 241 from the image database 24 via the contents management server 21. In a case where the contents do not include image data, the process goes to step s45.

At step s44, the contents distribution server 22 determines whether the obtained original image data 241 is image data that can be displayed by the contents display terminal 3 when distributed as an image data page. In the case of determination that it cannot be displayed and cannot be distributed as an image data page (for example, image data of a G3 type facsimile), the process goes to step s47, and the contents distribution server 22 distributes original image data to the contents display terminal 3 by, for example, a distribution protocol that is suitable for distribution of image data. After that, the process goes to step s48, and the original image data distribution process is ended. In the case of determination that it can be displayed and can be distributed as an image data page, the process goes to step s45, and the contents distribution server 22 generates an original image data page. In a case where image data does not exist in the contents, the contents distribution server 22 generates an exception page.

At step s46, the contents distribution server 22 distributes the original image data page generated at step s45 to the contents display terminal 3. After that, the process goes to step s48, and the original image data distribution process is ended.

Second Embodiment of the Invention

In the first embodiment of the invention, assuming a case where the font size used on the display of the contents display terminal 3 is uniquely determined, the font size used in the contents display terminal 3 is stored in the contents display terminal information storage section, and image data is converted to the font size by the use of that value.

In a second embodiment of the invention, every time the contents display terminal requests the contents server to distribute contents, the contents display terminal designates the font size to be used and requests distribution of contents, or designates the display size of the contents display terminal and requests distribution of contents. The contents server converts the size of an image in response to the request, and distributes contents to the contents display terminal. Therefore, in the second embodiment of the invention, the contents display terminal information storage section that is necessary in the first embodiment is unnecessary.

Below, the second embodiment of the invention will be described in detail referring to the drawings.

Figure 8:
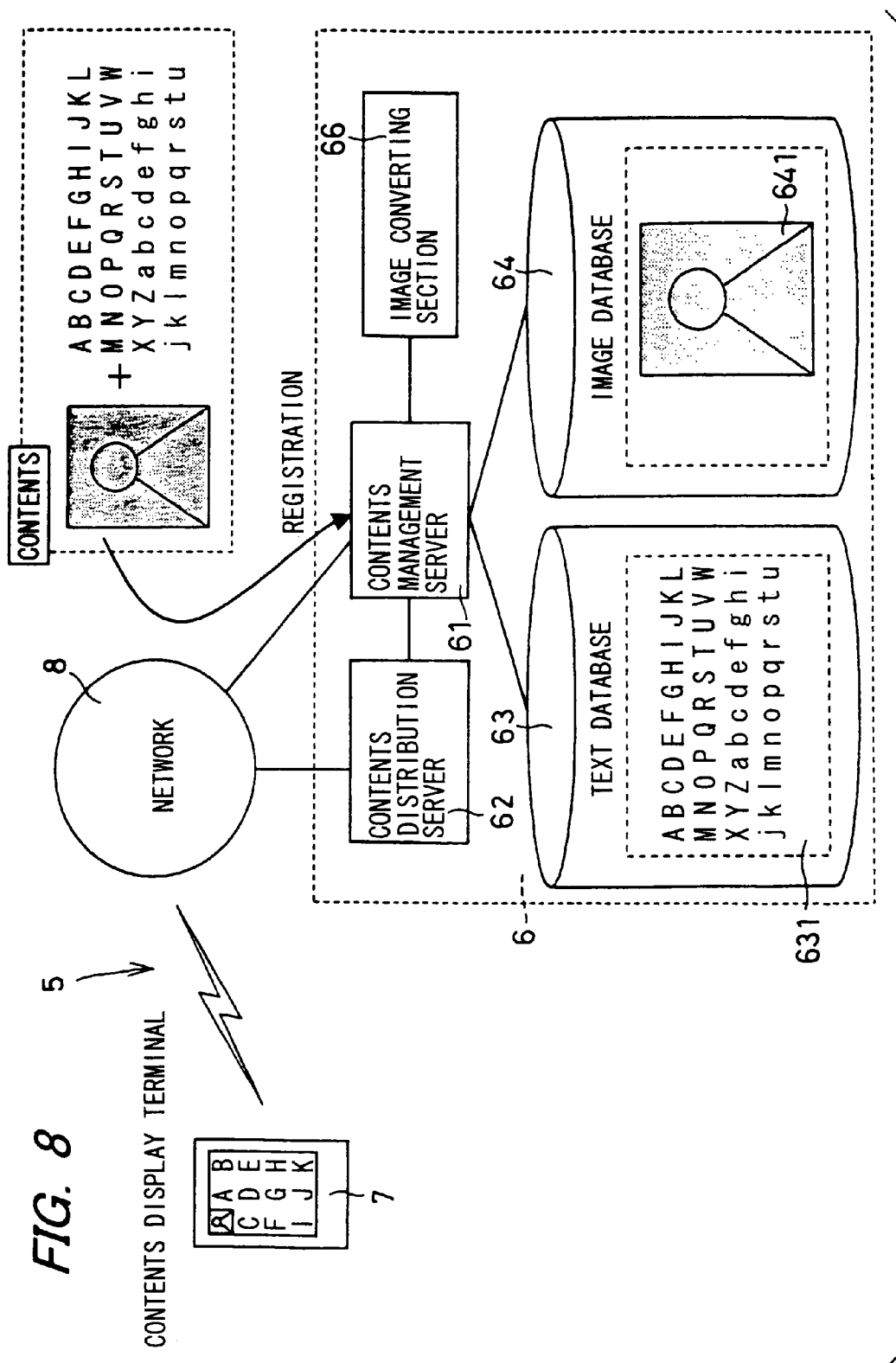
FIG. 8 is a block diagram showing the constitution of a contents distribution system, which is a second embodiment of the invention.

FIG. 8 is a block diagram showing the constitution of a contents distribution system as the second embodiment of the invention, which is a constitution that the contents terminal information storage section 25 is eliminated from the constitution of the contents distribution system of the first embodiment of FIG. 1.

A contents distribution system 5 comprises a contents server 6 and a contents display terminal 7. The contents server 6 and the contents display terminal 7 are connected via a network 8.

The contents server 6 comprises a contents distribution server 62, a contents management server 61, a text database 63, an image database 64, and an image converting section 66.

The contents display terminal 7 is realized by a personal computer (PC), a mobile terminal, a mobile phone or the like, and constituted so as to access the contents server 6 via the network 8 and be provided with distribution service of contents composed of text data and image data. Recently, it has become possible to connect to a network such as the Internet by a household telephone, a facsimile or the like. Therefore, the contents display terminal can be of any kind as far as it allows connection to the network.

The contents distribution server 62, in response to a distribution request from the contents display terminal 7, obtains contents designated by the contents management server 61, and distributes the contents to the contents display terminal 7.

The contents management server 61 manages registered contents, and when the contents distribution server 62 requests contents, provides the designated contents to the contents distribution server 62.

The text database 63 and the image database 64 are contents storing means, and store text data 631 and image data 641 such as still image data of registered contents, respectively.

The image converting section 66 is image converting means that has an image converting function. When the font size used in the contents display terminal 7, the display size and the like that are designated when the contents display terminal 7 requests distribution of contents are designated by the contents management server 61, the image converting section 66, by the image converting function, converts the image data 641 of the requested contents, and generates image letter data, preview image data and the like of almost the same size, preferably, the same size as the font size.

When the contents display terminal 7 requests the contents server 6 to distribute contents, the contents distribution server 62 designates the contents and font size designated by the contents display terminal 7 to the contents management server 61, and requests the contents.

The contents management server 61 obtains the image data 641 of the designated contents from the image database, causes the image converting section 66 to convert the image data 641 based on the designated font size and generate image letter data of almost the same size, preferably, the same size as the font size, and returns to the contents distribution server 62 together with the text data 631 obtained from the text database 24.

The contents distribution server 62 couples the text data 631 and the image letter data 642 of almost the same size, preferably, the same size as the font size obtained from the contents management server 61, and distributes the coupled data to the contents display terminal 7.

Figure 9:
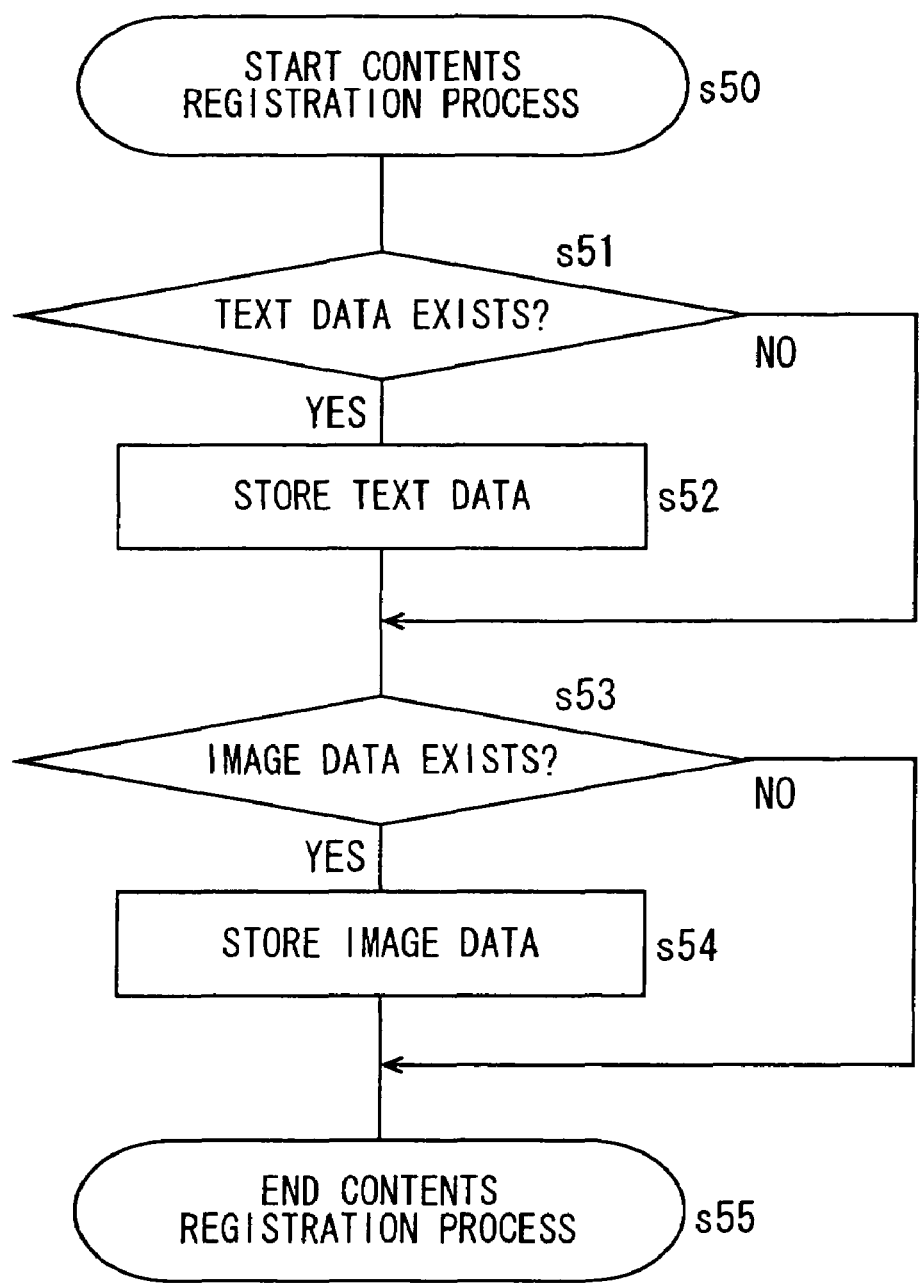
FIG. 9 is a flowchart showing a contents registration process of a contents management server in the contents distribution system of the second embodiment of the invention.

FIG. 9 is a flowchart showing a contents registration process of the contents management server 61 in the contents distribution system 5 of the second embodiment of the invention.

When a registration event arises, for example, when contents are uploaded, the contents registration process is started at step s50.

At step s51, the contents management server 61 determines whether contents to be registered include text data. In the case of determination that the contents do not include text data, the process goes to step s53. In the case of determination that the contents include text data, the process goes to step s52, the text data 631 is stored into the text database 63, and the process goes to step s53.

At step s53, the contents management server 61 determines whether the contents to be registered include image data. In the case of determination that the contents include image data, the process goes to step s54, and the contents management server 61 stores the image data 641 into the image database 64. After that, the process goes to step s55, and the contents registration process is ended. In the case of determination that the contents do not include image data, the process goes to step s55, and the contents registration process is ended.

Figure 10:
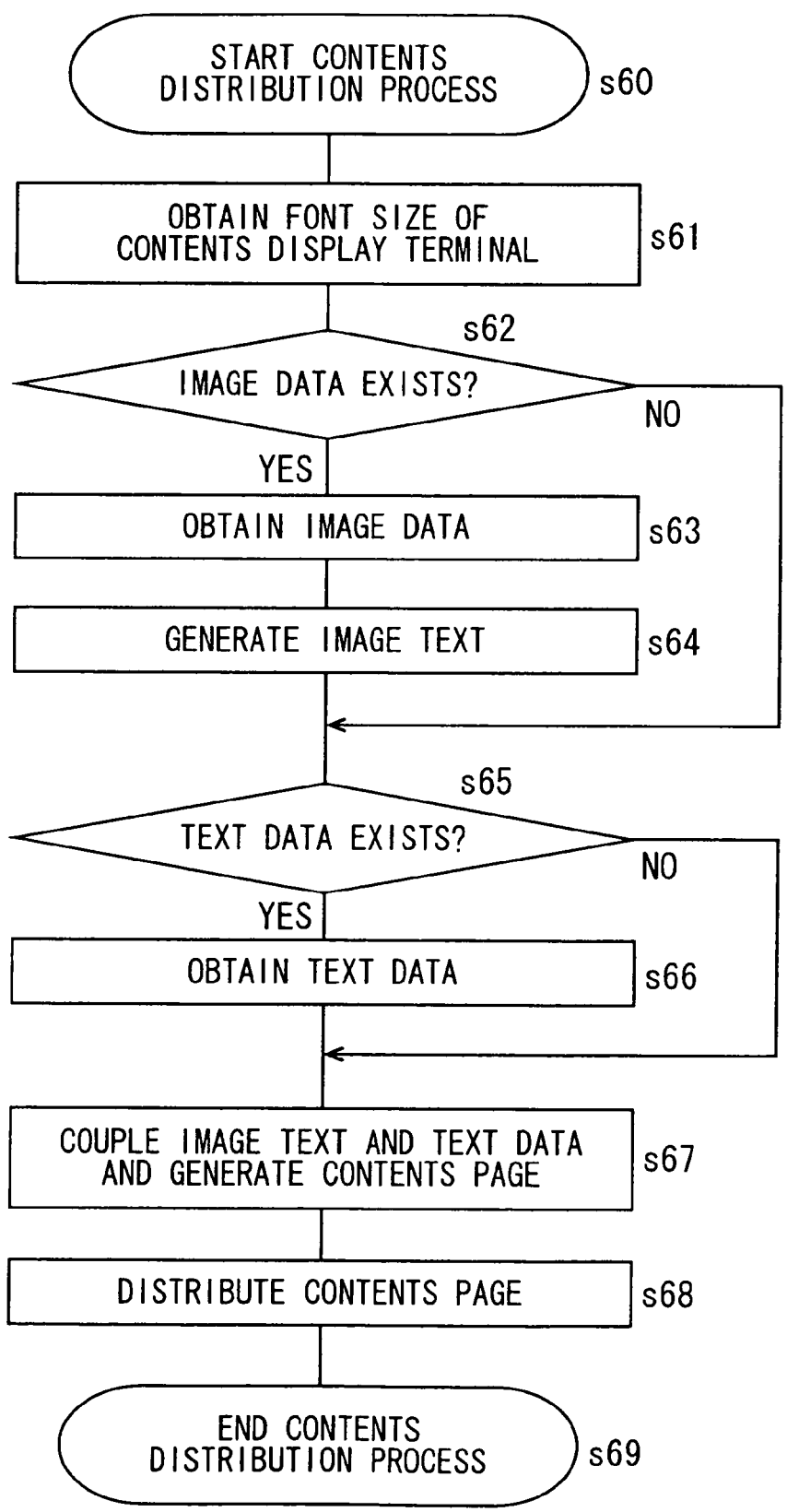
FIG. 10 is a flowchart showing a contents distribution process of a contents server in the contents distribution system of the second embodiment of the invention.

FIG. 10 is a flowchart showing a contents distribution process of the contents server 6 in the contents distribution system 5 of the second embodiment of the invention.

When an event of a contents distribution request from the contents display terminal 7 to the contents server 6 arises, the contents distribution process is started at step s60.

At step s61, the contents distribution server 62 obtains the font size used in the contents display terminal 7 included in a contents distribution request signal.

At step s62, the contents distribution server 62 inquires of the contents management server 61 whether contents requested by the contents display terminal 7 to be distributed include image data. In a case where the contents include image data, at step s63, the contents management server 61 obtains the image data 641 from the image database 64, and causes the image converting section 66 to convert the image data 641 to almost the same size, preferably, the same size as the designated font size and generate image letter data. In a case where the contents do not include image data, the process goes to step s65.

At step s65, the contents distribution server 62 inquires of the contents management server 61 whether the contents requested by the contents display terminal 7 to be distributed include text data. In a case where the contents include text data, at step s66, the contents distribution server 62 obtains the text data 631 of the contents from the text database 63 via the contents management server 61. In a case where the contents do not include text data, the process goes to step s67.

At step s67, the contents distribution server 62 couples the generated image letter data and text data 631 and generates a contents page. Although various coupling methods, for example, coupling the text data 631 to the image letter data, or coupling the image letter data to the text data 631 can be thought as a coupling method on this occasion, this is set as a contents page generation rule in advance. It is needless to say that in a case where one of the image letter data and text data 631 does not exist, the contents distribution server 62 generates a page of only the existing data. In a case where either of the data does not exist, the contents distribution server 62 generates an exception page for a case where contents do not exist.

At step s68, the contents distribution server 62 distributes the contents page generated at step s67 to the contents display terminal 7. After that, the process goes to step s69, and the contents distribution process is ended.

Figure 11:
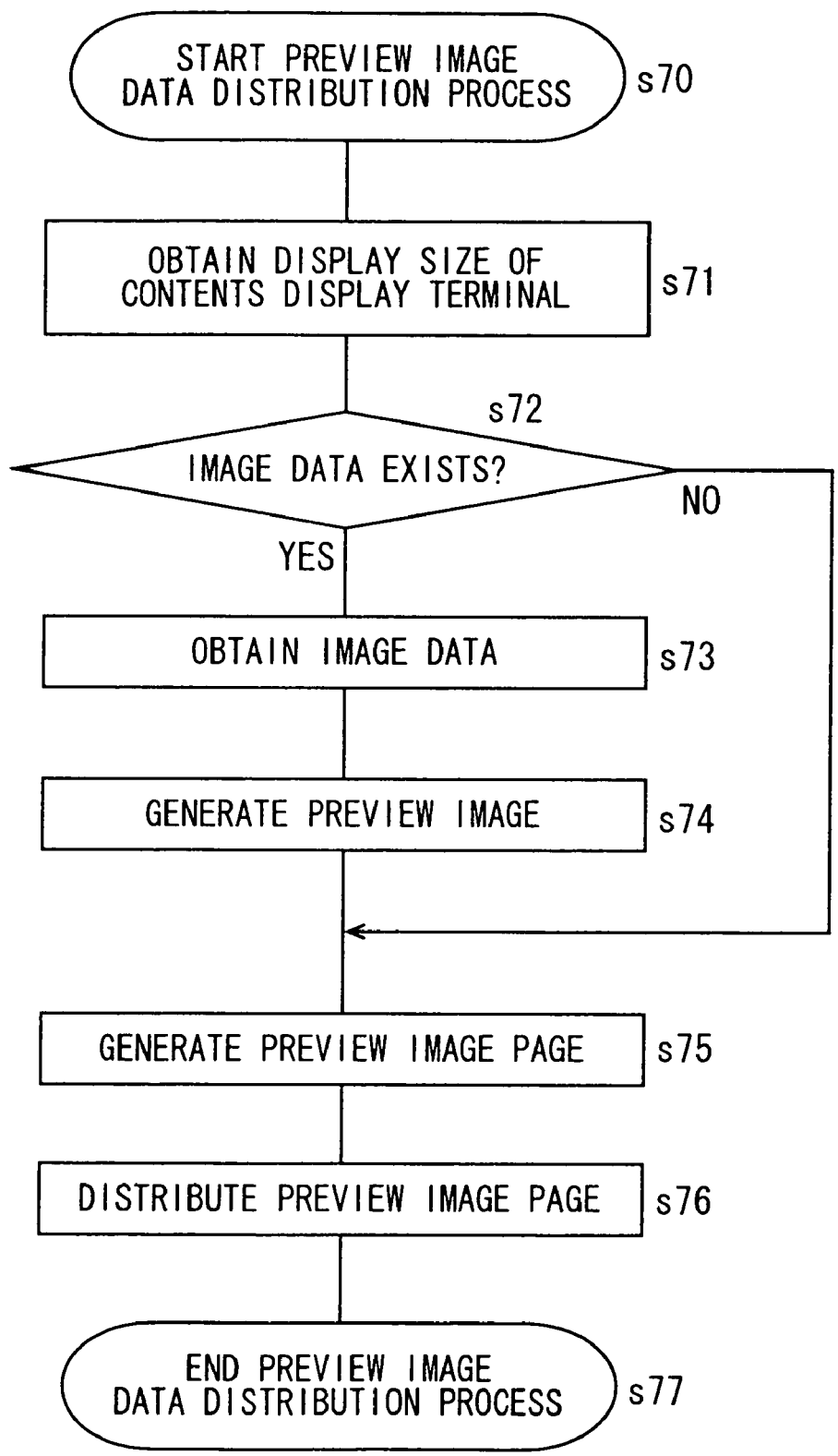
FIG. 11 is a flowchart showing a preview image data distribution process of the contents server in the contents distribution system of the second embodiment of the invention.

FIG. 11 is a flowchart showing a preview image data distribution process of the contents server 6 in the contents distribution system 5 of the second embodiment of the invention.

When an event of a preview image data distribution request from the contents display terminal 7 to the contents server 6 arises, at step s70, the preview image data distribution process is started.

At step s71, the contents distribution server 61 obtains the display size of the contents display terminal 7 included in a contents distribution request signal.

At step s72, the contents distribution server 62 inquires of the contents management server 61 whether contents requested by the contents display terminal 7 to be distributed include image data. In a case where the contents include image data, the contents management server 61 obtains the image data 641 from the image database 64 at step s73, causes the image converting section 66 to generate preview image data corresponding to the display size, specifically, of almost the same size, preferably, the same size as the display size at step s74, and the process goes to step s75. In a case where the contents do not include image data, the process goes to step s75.

At step s75, the contents distribution server 62 generates a preview image page by using the generated preview image data. In a case where image data does not exist in the contents, the contents distribution server 62 generates an exception page. At step s76, the contents distribution server 62 distributes the preview image page generated at step s75 to the contents display terminal 7. After that, the process goes to step s77, and the preview image data distribution process is ended.

Figure 12:
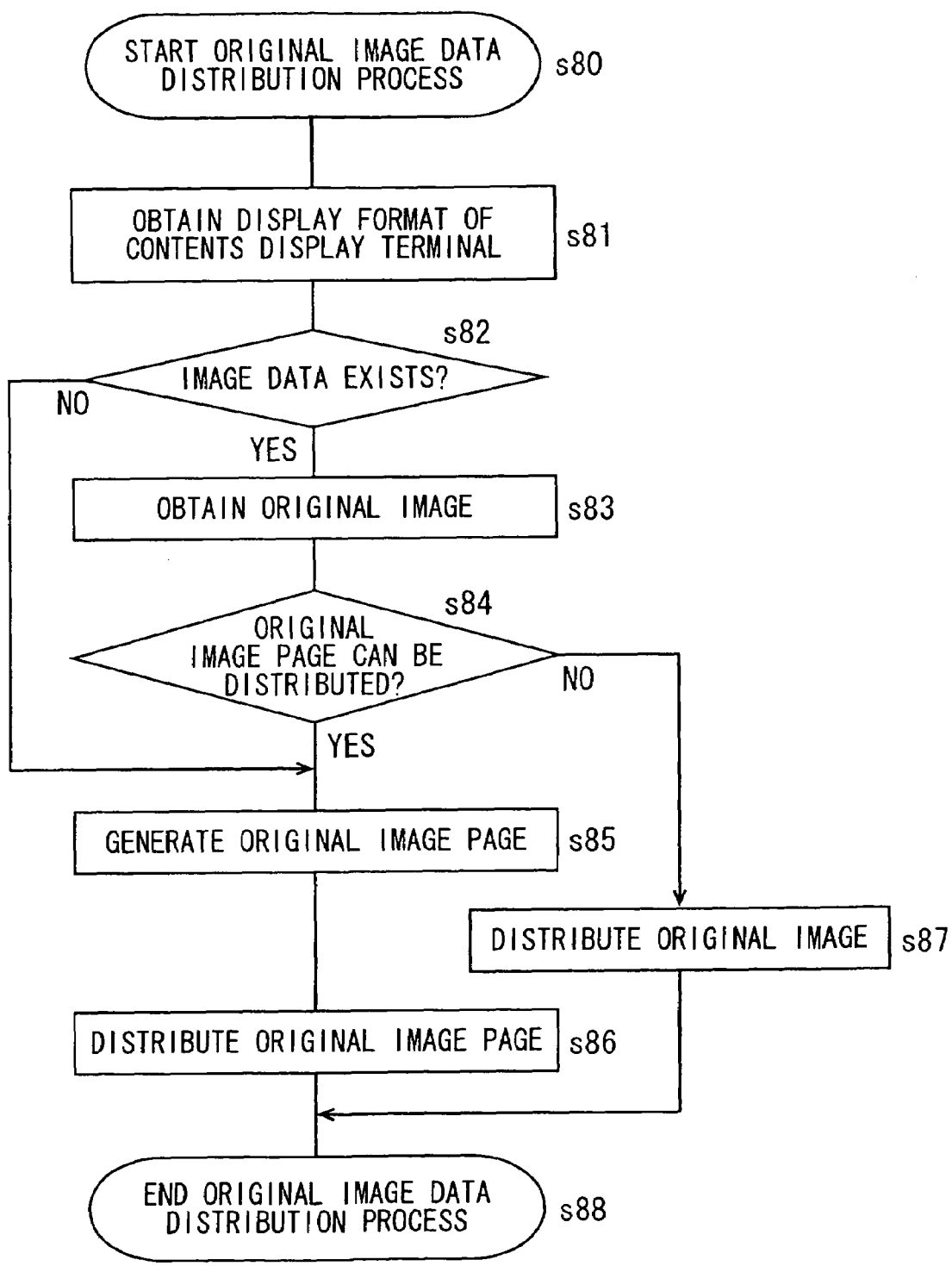
FIG. 12 is a flowchart showing an original image data distribution process of the contents server in the contents distribution system of the second embodiment of the invention.

FIG. 12 is a flowchart showing an original image data distribution process of the contents server 6 in the contents distribution system 5 of the second embodiment of the invention.

When an event of an original image data distribution request from the contents display terminal 7 to the contents server 6 arises, at step s80, the original image data distribution process is started.

At step s81, the contents distribution server 61 obtains the classification of the contents display terminal 7 from a user agent property or the like included in a contents distribution request signal.

At step s82, the contents distribution server 62 inquires of the contents management server 61 whether contents requested by the contents display terminal 7 to be distributed include image data. In a case where the contents include image data, at step s83, the contents distribution server 62 obtains the original image data 641 from the image database 64 via the contents management server 61. In a case where the contents do not include image data, the process goes to step s85.

At step s84, the contents distribution server 62 determines whether the obtained original image data 641 is image data that can be displayed in the contents display terminal 7 when distributed as an image data page.

In the case of determination that it cannot be displayed and cannot be distributed as an image data page (for example, image data of a G3 type facsimile), the process goes to step s87, and the contents distribution server 62 distributes the original image data 641 to the contents display terminal 7 by, for example, a distribution protocol that is suitable for distribution of image data. After that, the process goes to step s88, and the original image data distribution process is ended.

In the case of determination that it can be displayed and can be distributed as an image data page, the process goes to step s85, and the contents distribution server 62 generates an original image data page. In a case where image data does not exist in the contents, the contents distribution server 62 generates an exception page.

At step s86, the contents distribution server 62 distributes the original image data page generated at step s85 to the contents display terminal 7. After that, the process goes to step s88, and the original image data distribution process is ended.

Third Embodiment of the Invention

A third embodiment of the invention shows a case where the image data in the first embodiment of the invention is moving image data. Below, the third embodiment of the invention will be described in detail referring to the drawings.

Figure 13:
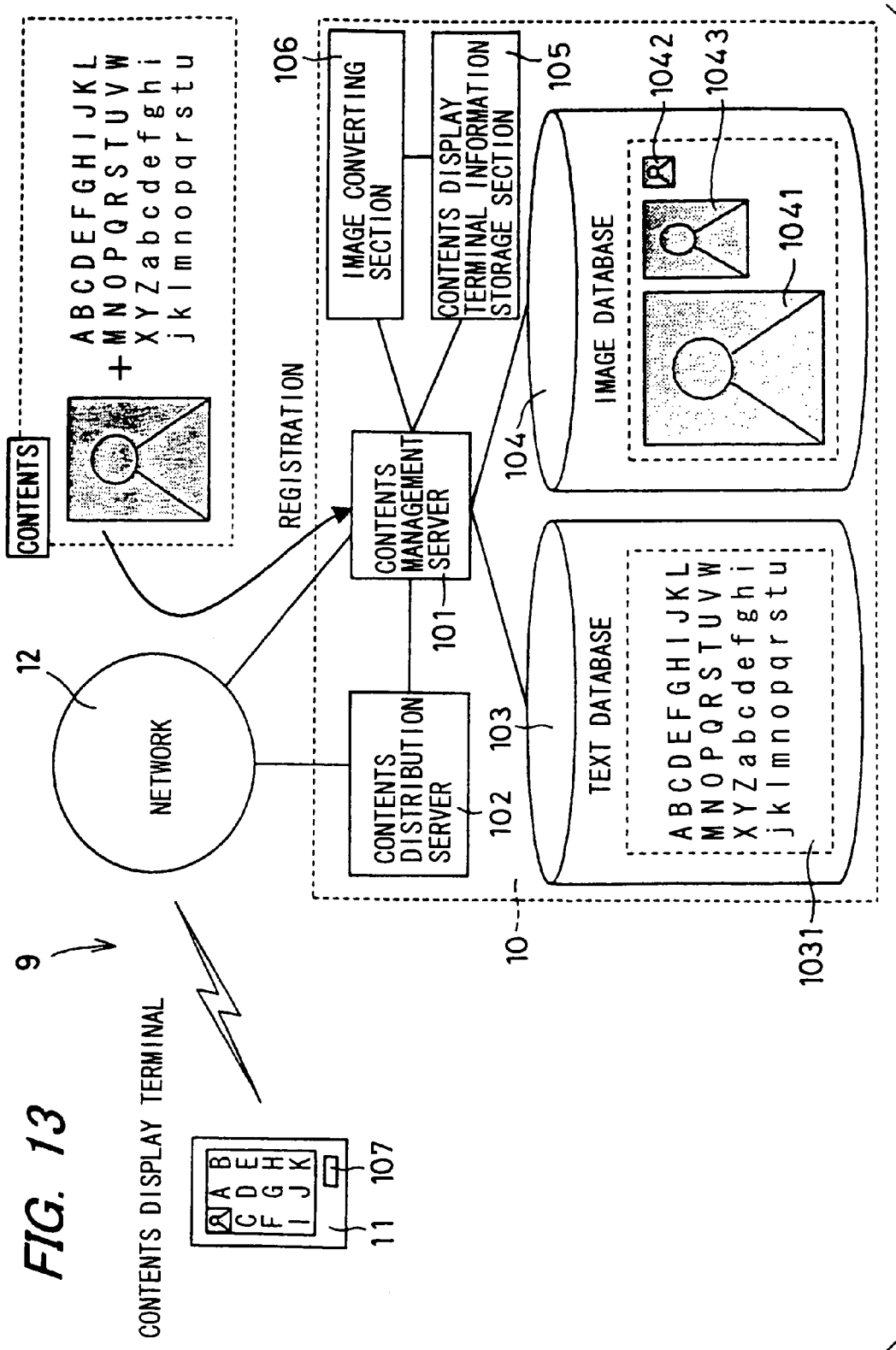
FIG. 13 is a block diagram showing the constitution of a contents distribution system, which is a third embodiment of the invention.

FIG. 13 is a block diagram showing the constitution of a contents distribution system 9, which is the third embodiment of the invention.

The contents distribution system 9 comprises a contents server 10 and a contents display terminal 11. The contents server 10 and the contents display terminal 11 are connected via a network 12. The contents server 10 comprises a contents distribution server 102, a contents management server 101, a text database 103, an image database 104, a contents display terminal information storage section 105, and an image converting section 106.

The contents display terminal 11 is realized by a personal computer (PC), a mobile terminal, a mobile phone or the like, and constituted so as to access the contents server 10 via the network 12 and be provided with distribution service of contents composed of text data and moving image data. Recently, it has become possible to connect to a network such as the Internet by a household telephone, a facsimile or the like. Therefore, the contents display terminal can be of any kind as far as it allows connection to the network.

The contents distribution server 102, in response to a distribution request from the contents display terminal 11, obtains contents designated by the contents management server 101 and distributes the contents to the contents display terminal 11. The contents management server 101 manages registered contents, and when the contents distribution server 102 requests contents, provides the designated contents to the contents distribution server 102.

The text database 103 and the image database 104 are contents storing means, and store text data 1031 and moving image data 1041 as image data of the registered contents, respectively. The contents display terminal information storage section 105 is terminal information storing means that stores the font size of text data displayed by a display of the contents display terminal 11 used in the contents distribution system 9 and the size of the display as terminal information.

The image converting section 106 is image converting means that has an image converting function. The image converting section 106, by the image converting function, when moving image data of contents is registered in the contents management server 101 and stored in the image database 104, obtains the font size and the display size stored in the contents display terminal information storage section 105, and generates moving image data 1042 of a letter size as image letter data made by converting the original moving image data 1041 to almost the same size, preferably, the same size as the font size. Besides, the image converting section 106, by the image converting function, generates preview moving image data 1043 as preview image data made by converting the original moving image data 1041 to almost the same size, preferably, the same size as the display size.

The contents management server 101 stores the moving image data 1042 of a letter size and the preview moving image data 1043 generated by the image converting section 106 together with the original moving image data 1041 into the image database 104. In a case where the contents display terminal information storage section 105 stores a plurality of terminal information, the image converting section 106 generates moving image data of a letter size and preview moving image data regarding the respective terminal information. Moreover, the contents management server 101 stores the generated plural moving image data of a letter size and preview moving image data into the image database 104.

When contents distribution is requested from the contents display terminal 11 to the contents server 10, the contents server 10 couples the text data 1031 and the moving image data 1042 of a letter size, and distributes the coupled data to the contents display terminal 11.

On this occasion, as shown in the contents display example of the embodiment of the invention of FIG. 2, the moving image data of a letter size of the contents page displayed on the display is almost the same size, preferably, the same size as the font size of the contents display terminal 11. Therefore, the moving image data 1042 of a letter size is dealt with as one letter of the text data 1031, and the need for adjusting the linefeed position of text data or the like and laying out moving image data and text data is eliminated. This is particularly effective, for example, in a case where the display of the contents display terminal 11 is small, or in a case where moving image data is large as compared with the size of the display.

Further, when distribution of the preview moving image data 1043 is requested from the contents display terminal 11 to the contents server 10, the contents server 10 distributes the preview moving image data 1043 to the contents display terminal 11. At this moment, in a contents page displayed on the display, only the preview moving image data 1043 is displayed. The preview moving image data is generated in an image format that can be displayed in the contents display terminal 11, the whole moving image data is displayed in a suitable size for the display, and it becomes easier to check the whole moving image data. It is also possible, after checking the whole image, to download the original moving image data. When distribution of the original moving image data is requested from the contents display terminal 11 to the contents server 10, the contents server 10 distributes the original moving image data 1041 to the contents display terminal 11, and the moving image data can be displayed when it can be displayed on the display of the contents display terminal 11. In such a case that the image formats are incompatible, it is also possible to store into image data storing means 107 of the contents display terminal 11 and output from an appropriate output apparatus as necessary.

Therefore, by the contents distribution system 9 of the third embodiment of the invention, it is possible to distribute contents composed of text data and moving image data as a contents page composed of text data and moving image data of a letter size that does not need a manual layout operation, firstly. Moreover, in the case of checking the content of moving image data, it is possible to distribute preview moving image data. Consequently, a user can download original moving image data after checking the content of moving image data, that is, it becomes possible to browse and obtain contents in an effective way.

Figure 14:
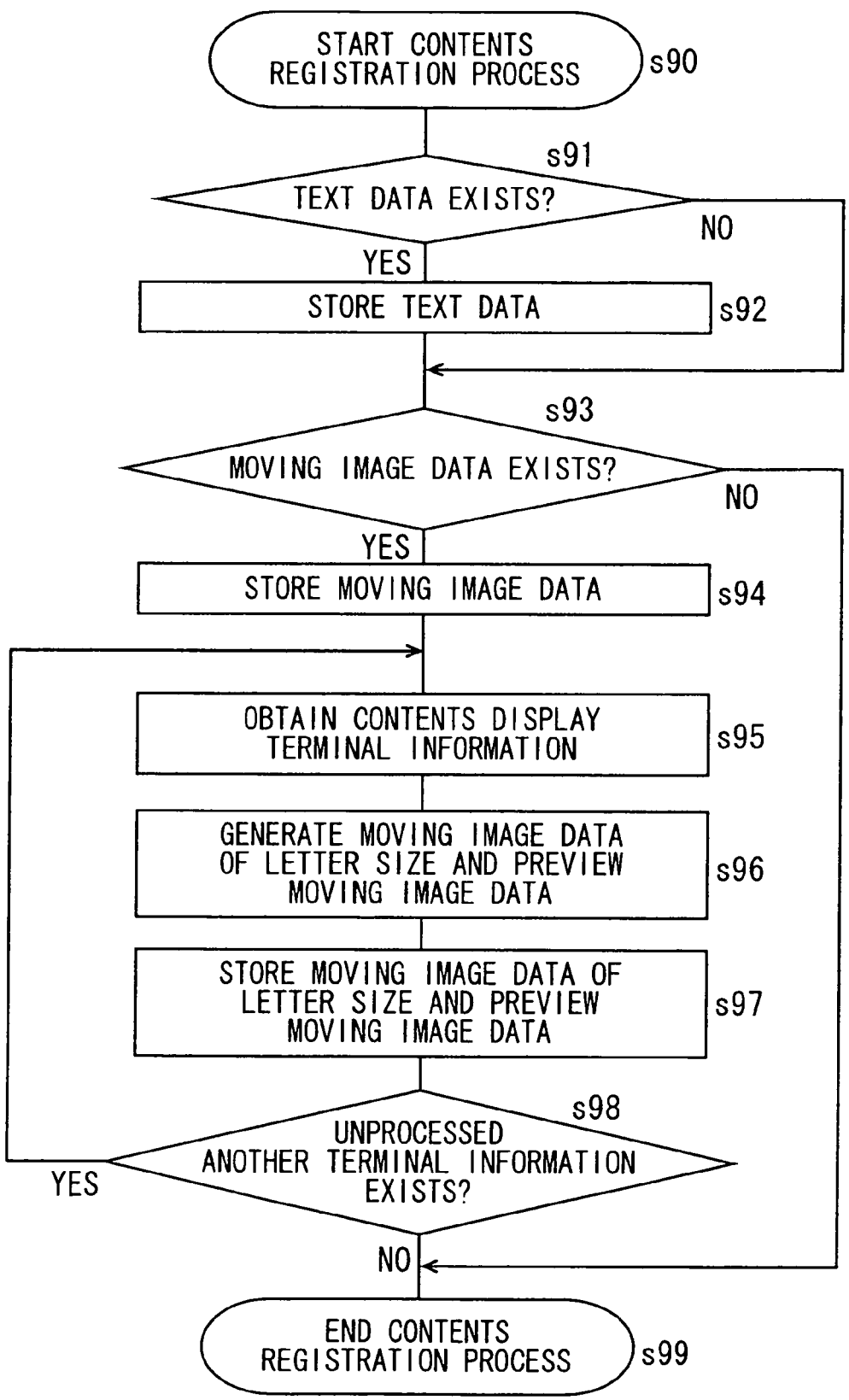
FIG. 14 is a flowchart showing a contents registration process of a contents management server in the contents distribution system of the third embodiment of the invention.

FIG. 14 is a flowchart showing a contents registration process of the contents management server 101 in the contents distribution system 9 of the third embodiment of the invention. When a registration event arises, for example, when contents are uploaded, the contents registration process is started at step s90. At step s91, the contents management server 101 determines whether contents to be registered include text data. In the case of determination that the contents do not include text data, the process goes to step s93. In the case of determination that the contents include text data, the process goes to step s92, the contents management server 101 stores the text data 1031 into the text database 103, and the process goes to step s93. At step s93, the contents management server 101 determines whether the contents to be registered include moving image data. In the case of determination that the contents include moving image data, the process goes to step s94. In the case of determination that the contents do not include moving image data, the process goes to step s99, and the contents registration process is ended.

At step s94, the contents management server 101 stores the original moving image data 1041 into the image database 104. At step s95, the contents management server 101 obtains the display size and the font size as terminal information from the contents display terminal information storage section 105. At step s96, the contents management server 101, based on the obtained terminal information, causes the image converting section 106 to generate the moving image data 1042 of a letter size converted to the font size and the preview moving image data 1043 converted to the display size from the moving image data. At step s97, the contents management server 101 stores the moving image data of a letter size and the preview moving image data generated at step s96 into the image database 104. After that, at step s98, the contents management server 101 determines whether terminal information on another contents display terminal is registered in the contents display terminal information storage section 105. In the case of determination that terminal information on another contents display terminal is registered, the process goes back to s95 to be repeated. In the case of determination that terminal information on another contents display terminal is not registered, the process goes to step s99, and the contents registration process is ended.

Figure 15:
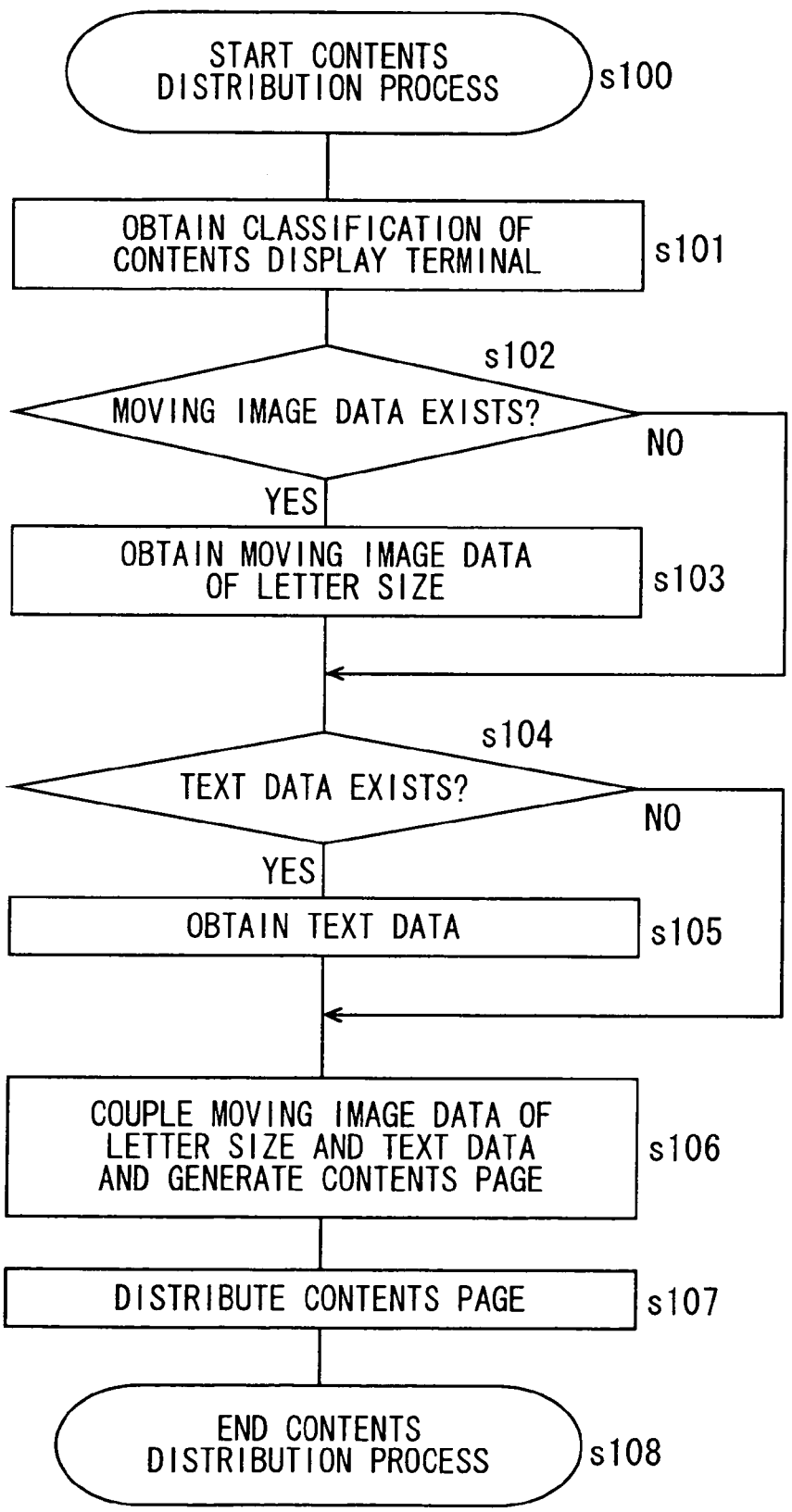
FIG. 15 is a flowchart showing a contents distribution process of a contents server in the contents distribution system of the third embodiment of the invention.

FIG. 15 is a flowchart showing a contents distribution process of the contents server 10 in the contents distribution system 9 of the third embodiment of the invention. When an event of a contents distribution request from the contents display terminal 11 to the contents server 10 arises, the contents distribution process is started at step s100. At step s101, the contents distribution server 102 obtains the classification of the contents display terminal 11 from a user agent property or the like included in a contents distribution request signal. At step s102, the contents distribution server 102 inquires of the contents management server 101 whether contents requested by the contents display terminal 11 to be distributed include moving image data. In a case where the contents include moving image data, at step s103, the contents management server 101 obtains terminal information corresponding to the classification of the contents display terminal 11 from the contents display terminal information storage section 105. The contents distribution server 102 obtains the moving image data 1042 corresponding to the font size of the terminal information, specifically, of almost the same size, preferably, the same size as the font size from the image database 104 via the contents management server 101. In a case where the contents do not include moving image data, the process goes to step s104.

At step s104, the contents distribution server 102 inquires of the contents management server 101 whether the contents request by the contents display terminal 11 to be distributed include text data. In a case where the contents include text data, at step s105, the contents distribution server 102 obtains the text data 1031 of the contents from the text database 103 via the contents management server 101. In a case where the contents do not include text data, the process goes to step s106.

At step s106, the contents distribution server 102 couples the obtained moving image data 1042 of a letter size and text data 1031, and generates a contents page. Although various coupling methods, for example, coupling the text data 1031 to the moving image data 1042 of a letter size, or coupling the moving image data 1042 of a letter size to the text data 1031 can be thought as a coupling method on this occasion, this is set as a contents page generation rule in advance. It is needless to say that in a case where one of the moving image data 1042 of a letter size and the text data 1031 does not exist, the contents distribution server 102 generates a page of only the existing data. In a case where either of the data does not exist, the contents distribution server 102 generates an exception page for a case where contents do not exist. At step s107, the contents distribution server 102 distributes the contents page generated at step s106 to the contents display terminal 11. After that, the process goes to step s108, and the contents distribution process is ended.

Figure 16:
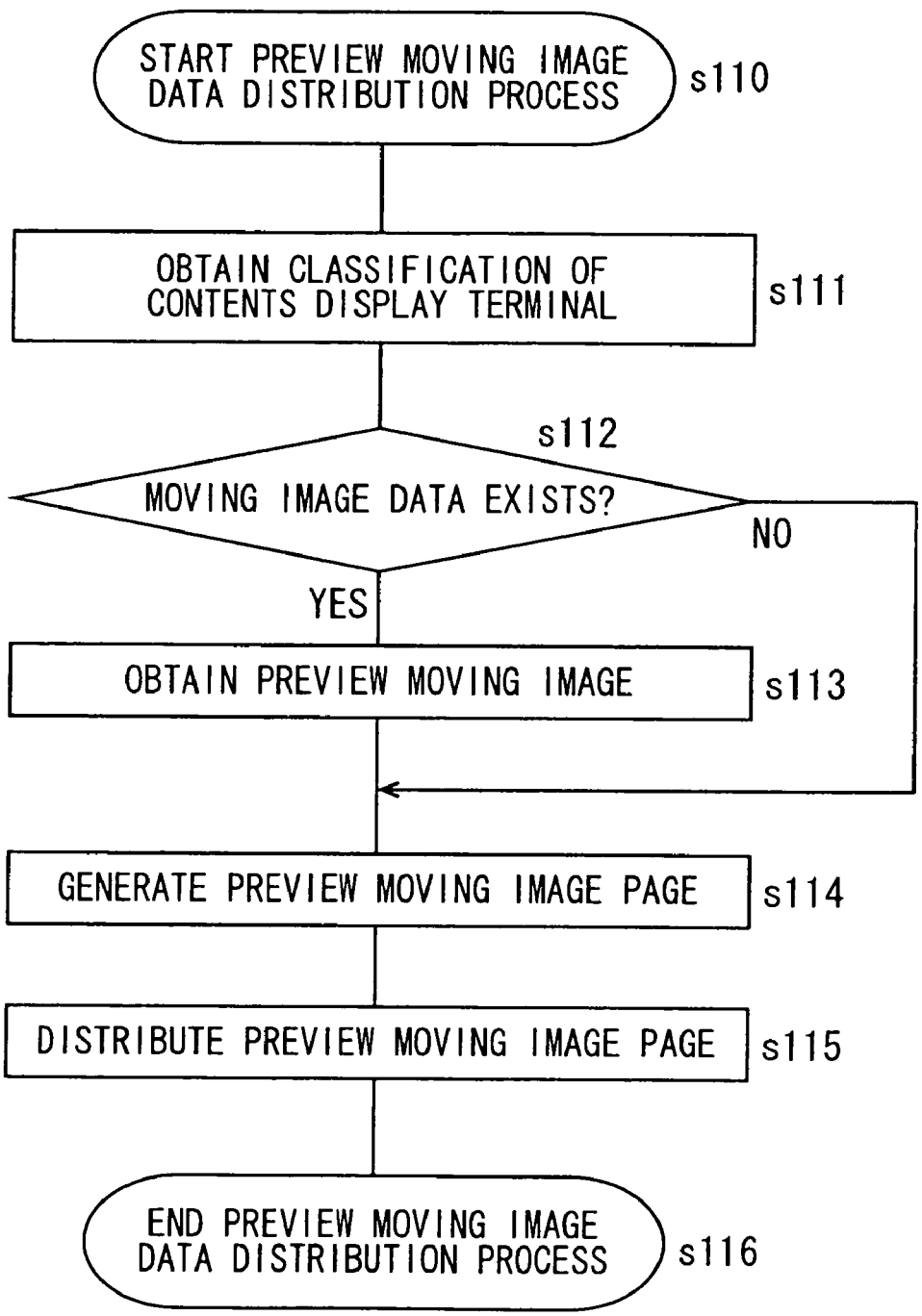
FIG. 16 is a flowchart showing a preview moving image data distribution process of the contents server in the contents distribution system of the third embodiment of the invention.

FIG. 16 is a flowchart showing a preview moving image data distribution process of the contents server 10 in the contents distribution system 9 of the third embodiment of the invention. When an event of a preview moving image data distribution request from the contents display terminal 11 to the contents server 10 arises, at step s110, the preview moving image data distribution process is started. At step s111, the contents distribution server 101 obtains the classification of the contents display terminal 11 from a user agent property or the like included in a contents distribution request signal.

At step s112, the contents distribution server 102 inquires of the contents management server 101 whether contents requested by the contents display terminal 11 to be distributed include moving image data. In a case where the contents include moving image data, at step s113, the contents management server 101 obtains terminal information corresponding to the classification of the contents display terminal 11 from the contents display terminal information storage section 105. The contents distribution server 102 obtains the preview moving image data 1043 corresponding to the display size of the terminal information, specifically, of almost the same size, preferably, the same size as the display size from the image database 104 via the contents management server 101. In a case where the contents do not include moving image data, the process goes to step s114.

At step s114, the contents distribution server 102 generates a preview moving image page by using the obtained preview moving image data 1043. In a case where moving image data does not exist in the contents, the contents distribution server 102 generates an exception page. At step s115, the contents distribution server 102 distributes the preview moving image page generated at step s114 to the contents display terminal 11. After that, the process goes to step s116, and the preview moving image data distribution process is ended.

Figure 17:
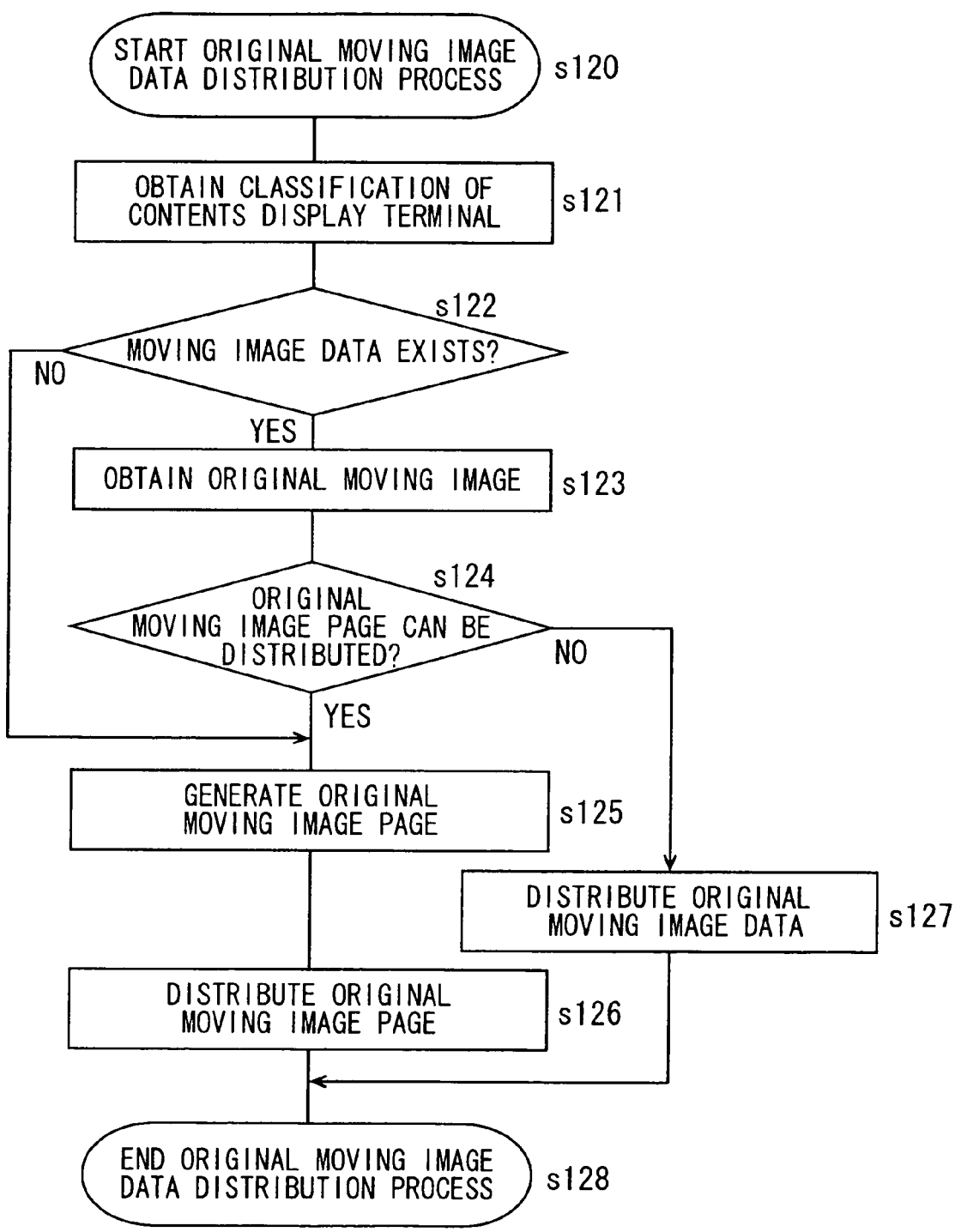
FIG. 17 is a flowchart showing an original image data distribution process of the contents server in the contents distribution system of the third embodiment of the invention.

FIG. 17 is a flowchart showing an original moving image data distribution process of the contents server 10 in the contents distribution system 9 of the third embodiment of the invention. When an event of an original moving image data distribution request from the contents display terminal 11 to the contents server 10 arises, at step s120, the original moving image data distribution process is started. At step s121, the contents distribution server 101 obtains the classification of the contents display terminal 11 from a user agent property or the like included in a contents distribution request signal.

At step s122, the contents distribution server 102 inquires of the contents management server 101 whether contents requested by the contents display terminal 11 to be distributed include moving image data. In a case where the contents include moving image data, at step s123, the contents distribution server 102 obtains the original moving image data 1041 from the image database 104 via the contents management server 101. In a case where the contents do not include moving image data, the process goes to step s125.

At step s124, the contents distribution server 102 determines whether the obtained original moving image data 1041 is moving image data that can be displayed in the contents display terminal 11 when distributed as an original moving image data page. In the case of determination that it cannot be displayed and cannot be distributed as an original moving image data page, the process goes to step s127, and the contents distribution server 102 distributes the original moving image data 1041 to the contents display terminal 11, for example, by a distribution protocol that is suitable for distribution of moving image data. After that, the process goes to step s128, and the original moving image data distribution process is ended. In the case of determination that it can be displayed and can be distributed as an original moving image data page, the process goes to step s125, and the contents distribution server 102 generates an original moving image data page. In a case where moving image data does not exist in the contents, the contents distribution server 102 generates an exception page.

At step s126, the contents distribution server 102 distributes the original moving image data page generated at step s125 to the contents display terminal 11. After that, the process goes to step s128, and the original moving image data distribution process is ended.

Fourth Embodiment of the Invention

A fourth embodiment of the invention shows a case where the image data in the second embodiment of the invention is moving image data. Below, the fourth embodiment of the invention will be described in detail referring to the drawings.

Figure 18:
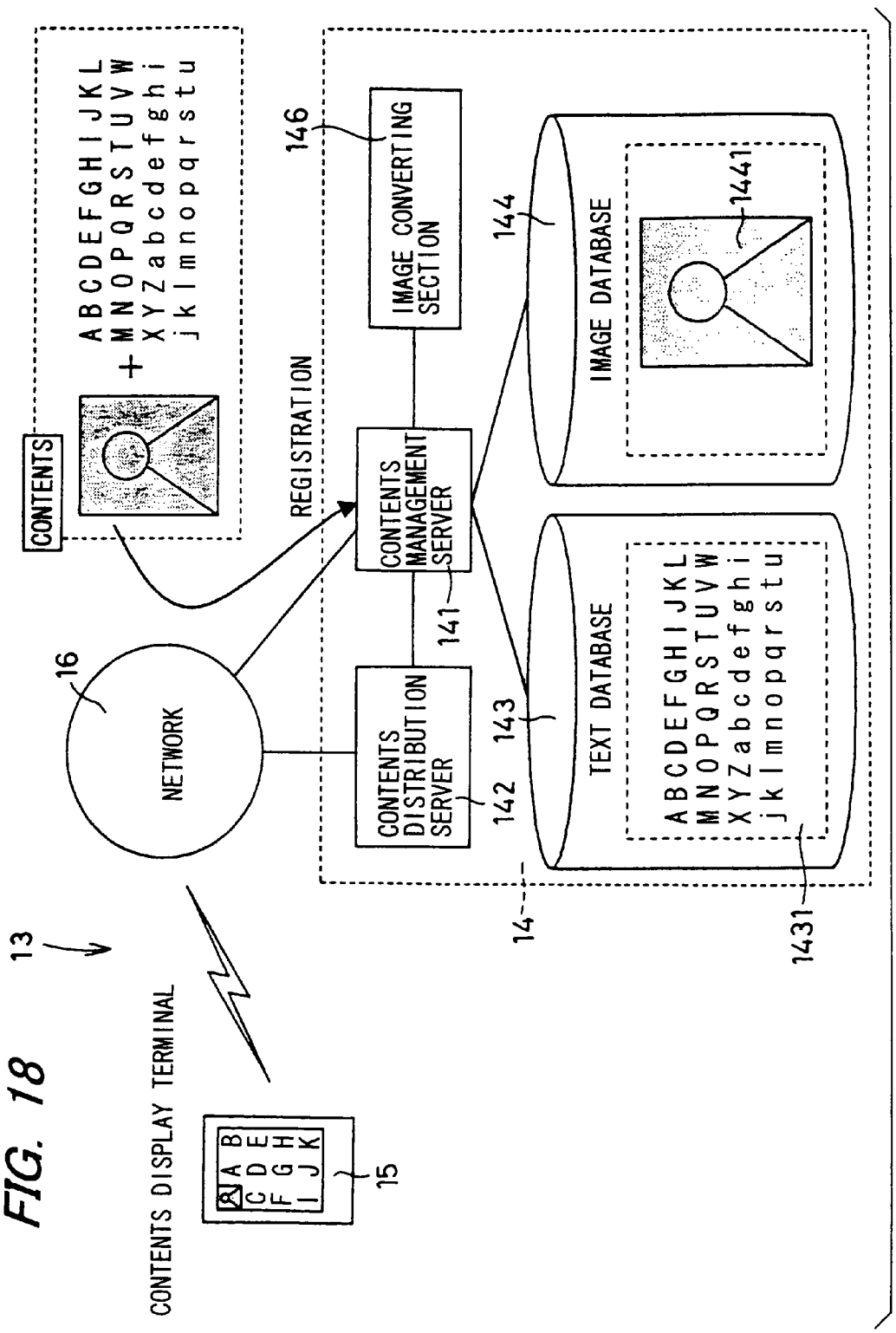
FIG. 18 is a block diagram showing the constitution of a contents distribution system, which is a fourth embodiment of the invention.

FIG. 18 is a block diagram showing the constitution of a contents distribution system as the fourth embodiment of the invention. A contents distribution system 13 comprises a contents server 14 and a contents display terminal 15. The contents server 14 and the contents display terminal 15 are connected via a network 16. The contents server 14 comprises a contents distribution server 142, a contents management server 141, a text database 143, an image database 144, and an image converting section 146.

The contents display terminal 15 is realized by a personal computer (PC), a mobile terminal, a mobile phone or the like, and constituted so as to access the contents server 14 via the network 16 and be provided with distribution service of contents composed of text data and moving image data. Recently, it has become possible to connect to a network such as the Internet by a household telephone, a facsimile or the like. Therefore, the contents display terminal can be of any kind as far as it allows connection to the network.

The contents distribution server 142, in response to a distribution request from the contents display terminal 15, obtains contents designated by the contents management server 141 and distributes the contents to the contents display terminal 15.

The contents management server 141 manages registered contents, and when the contents distribution server 142 requests contents, provides the designated contents to the contents distribution server 142.

The text database 143 and the image database 144 are contents storing means, and store text data 1431 and moving image data 1441 as image data of the registered contents, respectively.

The image converting section 146 is image converting means that has an image converting function. When the font size, display size and the like used in the contents display terminal 15 that are designated when the contents display terminal 15 requests distribution of contents are designated by the contents management server 141, the image converting section 146 converts moving image data 1441 of the requested contents to generate moving image data, preview moving image data and the like of almost the same size, preferably, the same size as a letter size.

When the contents display terminal 15 requests the contents server 14 to distribute contents, the contents distribution server 142 designates the contents and font size designated by the contents display terminal 15 to the contents management server 141, and requests the contents.

The contents management server 141 obtains the moving image data 1441 of the designated contents from the image database 144, causes the image converting section 146 to convert the moving image data 1441 based on the designated font size and generate moving image data of almost the same size, preferably, the same size as a letter size, and returns to the contents distribution server 142 together with text data 1431 obtained from the text database 143.

The contents distribution server 142 couples the text data 1431 and the moving image data of almost the same size, preferably, the same size as a letter size obtained from the contents management server 141, and distributes the coupled data to the contents display terminal 15.

Figure 19:
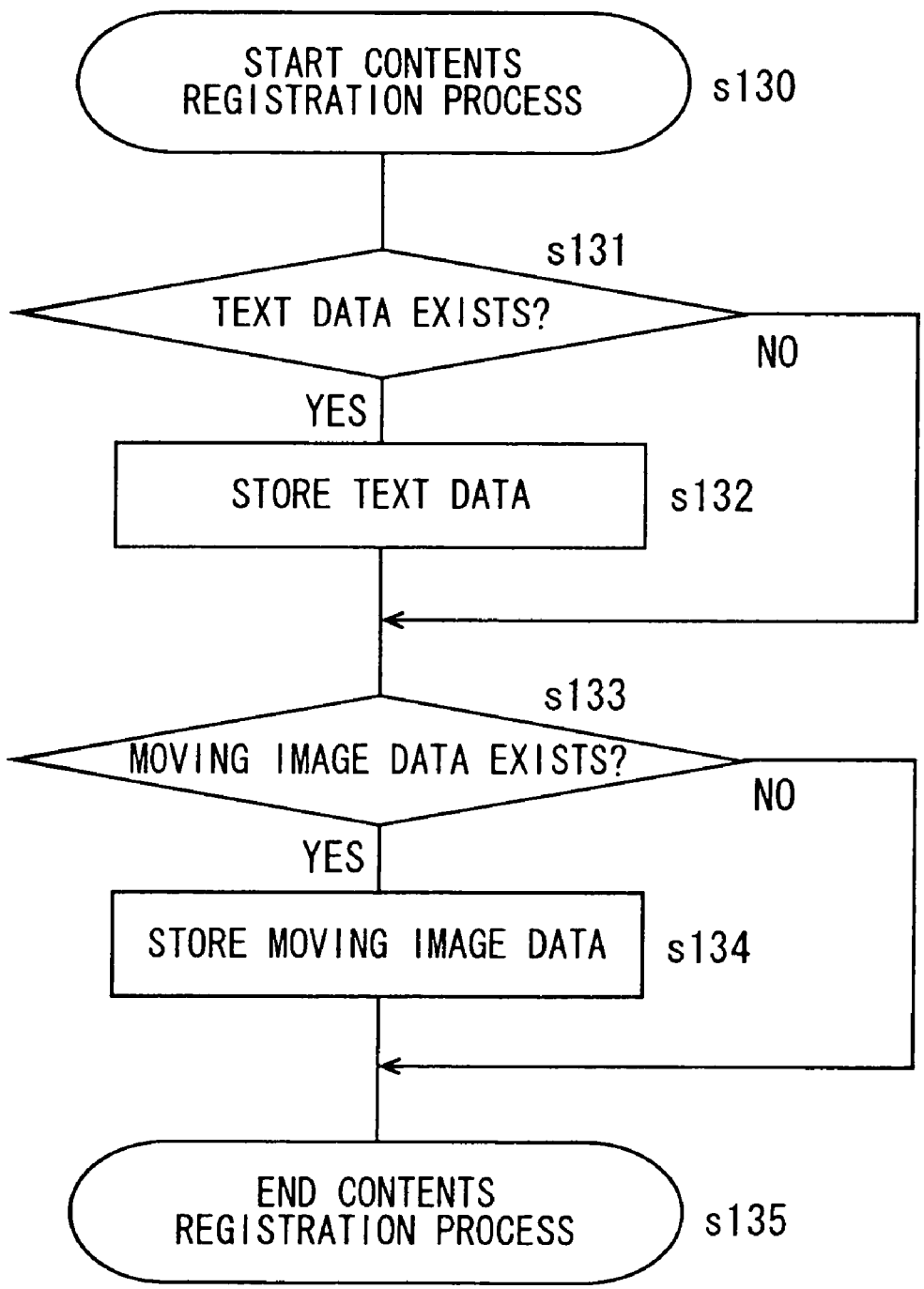
FIG. 19 is a flowchart showing a contents registration process of a contents management server in the contents distribution system of the fourth embodiment of the invention.

FIG. 19 is a flowchart showing a contents registration process of the contents management server 141 in the contents distribution system 13 of the fourth embodiment of the invention.

When a registration event arises, for example, when contents are uploaded, the contents registration process is started at step s130.

At step s131, the contents management server 141 determines whether contents to be registered include text data. In the case of determination that the contents do not include text data, the process goes to step s133. In the case of determination that the contents include text data, the process goes to step s132, the contents management server 141 stores the text data 143 into the text database 143, and the process goes to step s133.

At step s133, the contents management server 141 determines whether the contents to be registered include moving image data. In the case of determination that the contents include moving image data, the process goes to step s134, and the contents management server 141 stores the moving image data 1441 into the image database 144. After that, the process goes to step s135, and the contents registration process is ended. In the case of determination that the contents do not include moving image data, the process goes to step s135, and the contents registration process is ended.

Figure 20:
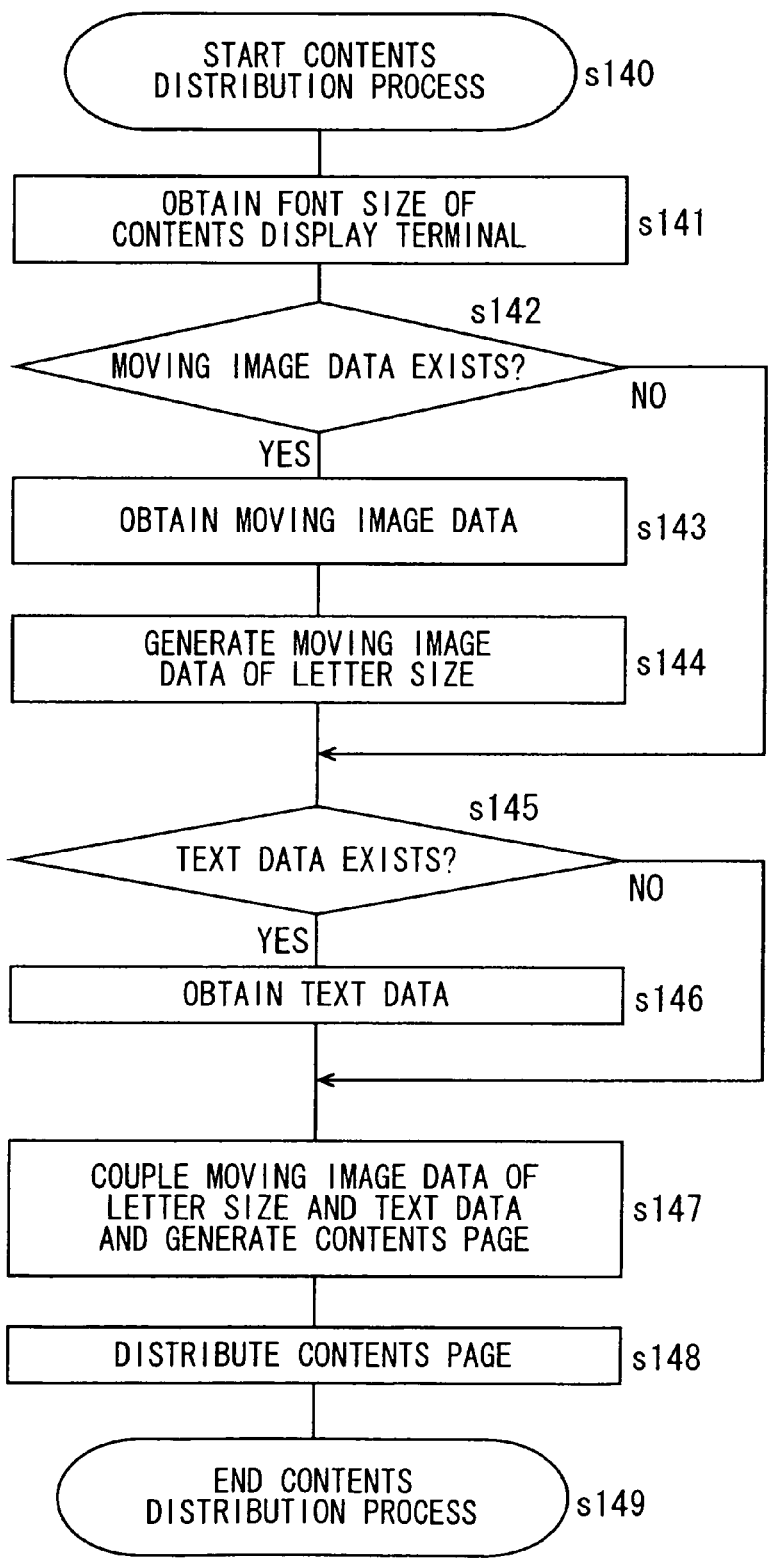
FIG. 20 is a flowchart showing a contents distribution process of a contents server in the contents distribution system of the fourth embodiment of the invention.

FIG. 20 is a flowchart showing a contents distribution process of the contents server 14 in the contents distribution system 13 of the fourth embodiment of the invention.

When an event of a contents distribution request from the contents display terminal 15 to the contents server 14 arises, the contents distribution process is started at step s140.

At step s141, the contents distribution server 142 obtains the font size used in the contents display terminal 15 included in a contents distribution request signal.

At step s142, the contents distribution server 142 inquires of the contents management server 141 whether contents requested by the contents display terminal 15 to be distributed include moving image data. In a case where the contents include moving image data, at step s143, the contents management server 141 obtains the moving image data 1441 from the image database 144, and causes the image converting section 146 to convert the moving image data 1441 to almost the same size, preferably, the same size as the designated font size and generate moving image data of a letter size, at step s144. In a case where the contents do not include moving image data, the process goes to step s145.

At step s145, the contents distribution server 142 inquires of the contents management server 141 whether the contents requested by the contents display terminal 15 to be distributed include text data. In a case where the contents include text data, at step s146, the contents distribution server 142 obtains the text data 1431 of the contents from the text database 143 via the contents management server 141. In a case where the contents do not include text data, the process goes to step s147.

At step s147, the contents distribution server 142 couples the generated moving image data of a letter size and text data 1431, and generates a contents page. Although various coupling methods, for example, coupling the text data 1431 to the moving image data of a letter size, or coupling the moving image data of a letter size to the text data 1431 can be thought as a coupling method on this occasion, this is set as a contents page generation rule in advance. It is needless to say that in a case where one of the moving image data of a letter size and the text data does not exist, the contents distribution server 142 generates a page of only the existing data. In a case where either of the data does not exist, the contents distribution server 142 generates an exception page for a case where contents do not exist.

At step s148, the contents distribution server 142 distributes the contents page generated at step s147 to the contents display terminal 15. After that, the process goes to step s149, and the contents distribution process is ended.

Figure 21:
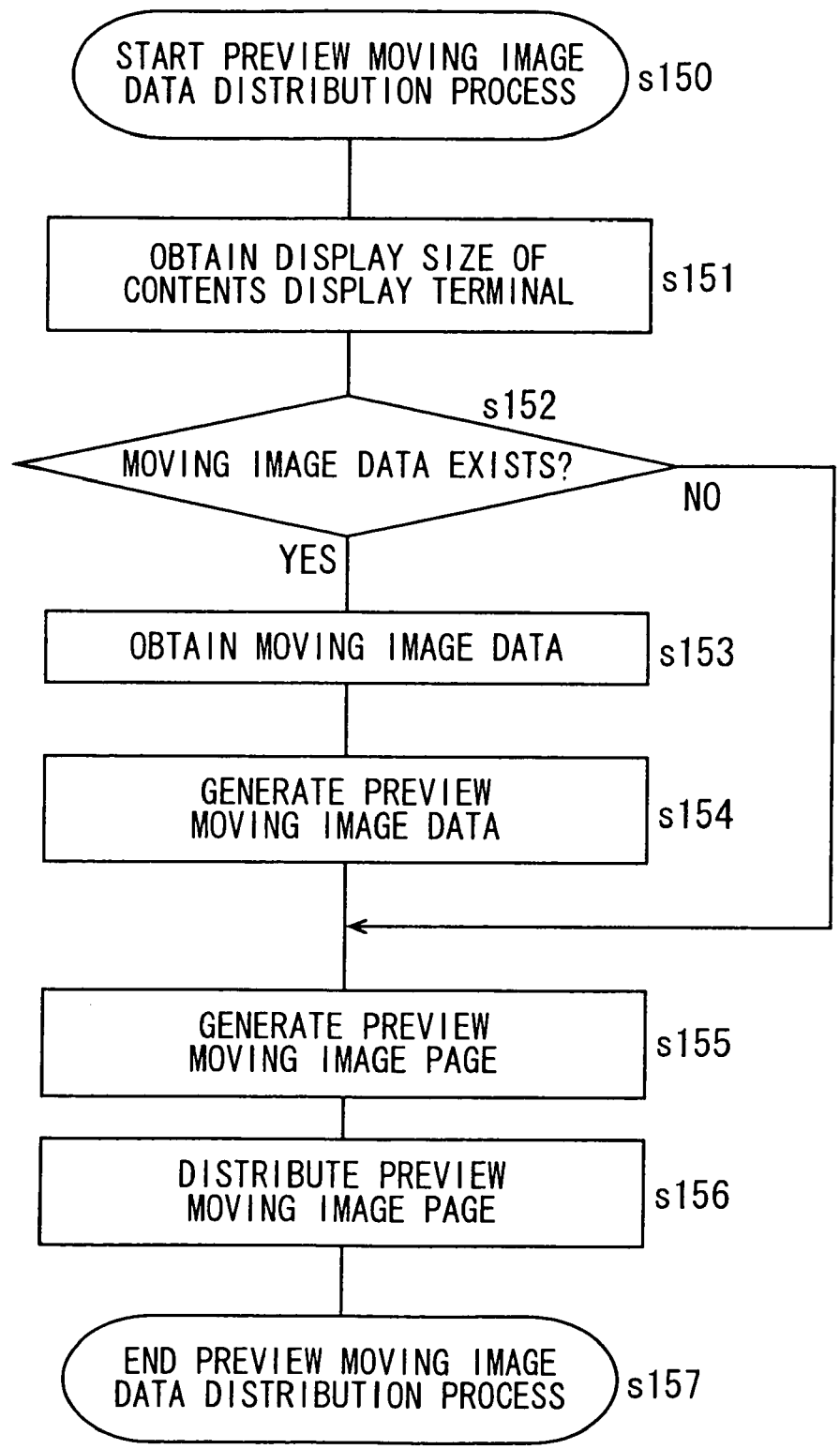
FIG. 21 is a flowchart showing a preview moving image data distribution process of the contents server in the contents distribution system of the fourth embodiment of the invention.

FIG. 21 is a flowchart showing a preview moving image data distribution process of the contents server 14 in the contents distribution system 13 of the fourth embodiment of the invention.

When an event of a preview moving image data distribution request from the contents display terminal 15 to the contents server 14 arises, at step s15O, the preview moving image data distribution process is started.

At step s151, the contents distribution server 141 obtains the display size of the contents display terminal 15 included in a contents distribution request signal.

At step s152, the contents distribution server 142 inquires of the contents management server 141 whether contents requested by the contents display terminal 15 to be distributed include moving image data. In a case where the contents include moving image data, the contents management server 141 obtains the moving image data 1441 from the image database 144 at step s153, causes the image converting section 146 to generate preview moving image data corresponding to the display size, specifically, of almost the same size, preferably, the same size as the display size at step s154, and the process goes to step s155. In a case where the contents do not include moving image data, the process goes to step s155.

At step s155, the contents distribution server 142 generates a preview image page by using the generated preview moving image data. In a case where moving image data does not exist in the contents, the contents distribution server 142 generates an exception page. At step s156, the contents distribution server 142 distributes the preview image page generated at step s155 to the contents display terminal 15. After that, the process goes to step s157, and the preview moving image data distribution process is ended.

Figure 22:
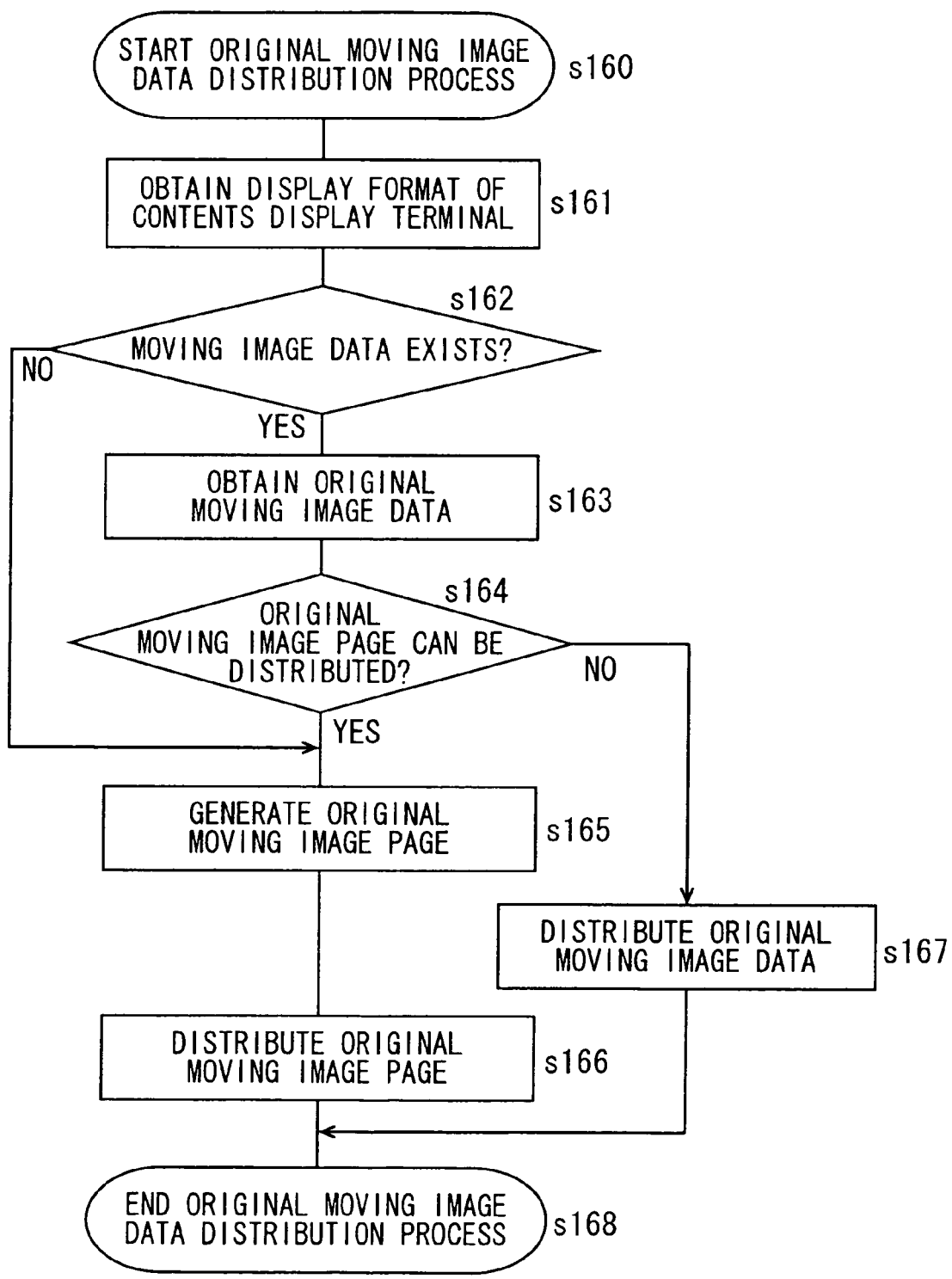
FIG. 22 is a flowchart showing an original image data distribution process of the contents server in the contents distribution system of the fourth embodiment of the invention.

FIG. 22 is a flowchart showing an original moving image data distribution process of the contents server 14 in the contents distribution system 13 of the fourth embodiment of the invention.

When an event of an original moving image data distribution request from the contents display terminal 15 to the contents server 14 arises, at step s160, the original moving image data distribution process is started.

At step s161, the contents distribution server 141 obtains the classification of the contents display terminal 15 from a user agent property or the like included in a contents distribution request signal.

At step s162, the contents distribution server 142 inquires of the contents management server 141 whether contents requested by the contents display terminal 15 to be distributed include moving image data. In a case where the contents include moving image data, at step s163, the contents distribution server 142 obtains the original moving image data 1441 from the image database 143 via the contents management server 141. In a case where the contents do not include moving image data, the process goes to step s165.

At step s164, the contents distribution server 142 determines whether the obtained original moving image data 1441 is moving image data that can be displayed in the contents display terminal 15 when distributed as an original moving image data page.

In the case of determination that it cannot be displayed and cannot be distributed as a moving image data page, the process goes to step s167, and the contents distribution server 142 distributes the original moving image data 1441 to the contents display terminal 15, for example, by a distribution protocol that is suitable for distribution of moving image data. After that, the process goes to step s168, and the original moving image data distribution process is ended. In the case of determination that it can be displayed and can be distributed as an original moving image data page, the process goes to step s165, and the contents distribution server 142 generates an original moving image data page. In a case where moving image data does not exist in the contents, the contents distribution server 142 generates an exception page.

At step s166, the contents distribution server 142 distributes the original moving image data page generated at step s165 to the contents display terminal 15. After that, the process goes to step s168, and the original moving image data distribution process is ended.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

INDUSTRIAL APPLICABILITY

As described above, according to the invention, it is allowed to deal with image data as one letter of text data, it is unnecessary to do a manual layout operation even in a case where image data and text data coexist, and it is possible to distribute contents that the content of image data is easier to understand than a page of only text data of contents.

Further, according to the invention, the whole image data is displayed in a suitable size for a display, and a check of the whole image data is facilitated.

Further, according to the invention, it is possible to display image data when it can be displayed on a display, and in a case where it cannot be displayed for such a reason that image formats are incompatible, it is possible to output image data stored in the image data storing means from an appropriate output apparatus as necessary.

The invention claimed is:

1. A contents distribution system, comprising:
   a contents display terminal which displays contents composed of text data and image data on a display; and
   a contents server which distributes the contents to the contents display terminal via a network in response to a distribution request from the contents display terminal, the contents server including:
   a memory storing a set of instructions; and
   a processor executing the set of instructions stored in memory to perform a method comprising:
   storing the contents;
   determining the font size of the text data to be displayed on the display; and
   converting the image data to image letter data of a same size as the determined font size of the text data displayed by the display of the contents display terminal, wherein the conversion is made based on the determined font size, and
   wherein, in response to a contents distribution request from the contents display terminal, the contents server couples the text data and the image letter data and distributes the coupled data to the contents display terminal.

2. The contents distribution system of claim 1, further comprising converting the image data of the contents to preview image data of almost a same size as a display size of the contents display terminal; and
   the contents server distributes the preview image data to the contents display terminal in response to a preview image data distribution request from the contents display terminal.

3. The contents distribution system of claim 1, wherein the contents server distributes the image data to the contents display terminal in response to an image data distribution request from the content display terminal; and
   the contents display terminal stores distributed image data, and displays the distributed image data when it can be displayed on the display.

4. The contents distribution system of claim 2, wherein the contents server distributes the image data to the contents display terminal in response to an image data distribution request from the content display terminal; and
   the contents display terminal stores distributed image data, and displays the distributed image data when it can be displayed on the display.

5. The contents distribution system of claim 1, wherein the contents server stores the font size of the text data displayed by the display of the contents display terminal and the display size as terminal information.

6. The contents distribution system of claim 1, wherein the image data is still image data.

7. The contents distribution system of claim 1, wherein the image data is moving image data.

8. A contents server which distributes contents composed of text data and image data to a contents display terminal via a network in response to a distribution request from the contents display terminal, the contents server comprising:
   a memory storing a set of instructions; and a processor, executing the stored set of instructions, to perform a method comprising:
   storing the contents;
   determining a font size of text data to be displayed by the display; and
   converting the image data to image letter data of almost a same size as the determined font size of text data displayed by the display of the contents display terminal, wherein the conversion is made based on the determined font size, and
   wherein, in response to a contents distribution request from the contents display terminal, the contents server couples the text data and the image letter data and distributes the coupled data to the contents display terminal.

9. The contents server of claim 8, further comprising converting the image data of the contents to preview image data of almost a same size as a display size of the contents display terminal; and
   in response to a preview image data distribution request from the contents display terminal, the preview image data is distributed to the contents display terminal.

10. The contents server of claim 8, further comprising:
    storing the font size of the text data displayed by the display of the contents display terminal and the display size as terminal information.

11. The contents server of claim 8, wherein the image data is still image data.

12. The contents server of claim 8, wherein the image data is moving image data.

13. A contents distribution method for converting image data and distributing text data and image data via a network in response to a distribution request from a contents display terminal, the contents distribution method comprising the steps of:
    storing uploaded contents in the contents server;
    determining the font size of text data to be displayed by a display;
    converting image data to image letter data of almost a same size as a font size of text data displayed by the display of the contents display terminal, by the contents server, wherein the conversion is made based on the determined font size; and
    coupling the text data and the image letter data and distributing the coupled data to the contents display terminal, in response to a contents distribution request from the contents display terminal, by the contents server.

14. The contents distribution method of claim 13, further comprising converting the image data of the contents to preview image data of almost a same size as the display size of the contents display terminal; and
    the contents server distributes the preview image data to the contents display terminal in response to a preview image data distribution request from the contents display terminal.

15. The contents distribution method of claim 13, further comprising converting image data based on the font size of the text data displayed by the display of the contents display terminal and the display size.

16. The contents distribution method of claim 13, wherein the contents server stores the font size of the text data displayed by the display of the contents display terminal and the display size as terminal information.

17. The contents distribution method of claim 13, wherein the image data is still image data.

18. The contents distribution method of claim 13, wherein the image data is moving image data.

19. The contents distribution system of claim 1, further comprising obtaining the font size of the text data and generates the image letter data to the same size as the obtained font size.

20. The contents distribution system of claim 1, further comprising storing the text data of the contents and the image data of the contents.

21. The contents server of claim 8, further comprising storing the text data of the contents and the image data of the contents.

* * * * *